United States Patent [19]

Inoue et al.

[11] Patent Number: 5,539,586
[45] Date of Patent: Jul. 23, 1996

[54] METHOD AND APPARATUS FOR RECORDING DIGITAL DATA ON A RECORDING MEDIUM BY RECORDING ODD-NUMBERED AND EVEN-NUMBERED DATA SEGMENTS AND COMPRESSED DIGITAL DATA IN DISTINCT RECORDING REGIONS

[75] Inventors: Hajime Inoue, Chiba; Ichiro Okamoto, Saitama, both of Japan

[73] Assignee: Sony Corporation, Tokyo, Japan

[21] Appl. No.: 405,442

[22] Filed: Mar. 16, 1995

Related U.S. Application Data

[63] Continuation of Ser. No. 74,480, Jun. 11, 1993, abandoned.

[30] Foreign Application Priority Data

Jun. 16, 1992 [JP] Japan ..................... 4-181922

[51] Int. Cl.[6] ................................. H04N 5/782
[52] U.S. Cl. ............................. 360/19.1; 360/32
[58] Field of Search ............................ 360/19.1, 32, 9.1, 360/27, 38.1, 53, 36.1, 36.2; 369/32

[56] References Cited

U.S. PATENT DOCUMENTS 4,389,681  6/1983  Tanaka et al. ..................... 360/27
4,675,750  6/1987  Collins et al. ..................... 360/9.1
4,682,312  7/1987  Furuya et al. ..................... 369/32
4,768,108  8/1988  Higurashi ..................... 360/19.1

FOREIGN PATENT DOCUMENTS 0373895  6/1990  Japan .

OTHER PUBLICATIONS

Patent Abstracts of Japan, vol. 14, No. 201 (P-1041) (4144) 24 Apr. 1990 & JP-A-24 2 686 (Mitsubishi) 13 Feb. 1990.
Patent Abstracts of Japan, vol. 14, No. 104 (P-1013) (4047) 26 Feb. 1990 & JP-A-13 07 977 (Mitsubishi) 12 Dec. 1989.

Primary Examiner—W. R. Young
Attorney, Agent, or Firm—William S. Frommer; Alvin Sinderbrand

[57] ABSTRACT

Each track on a recording medium has a video area used for recording video and audio data, and an audio area used exclusively for recording audio data. The audio area has two regions used for recording odd-numbered audio data segments and even-numbered audio data segments, respectively. The data recorded in one of the two regions may be interleaved to further reduce vulnerability of the audio data to errors. Parity data for the audio data is recorded in a third region located between the first and second regions in each track. The audio data represents a left and a right channel. The left channel audio data is recorded in a first set of consecutive tracks, and the right channel audio data is recorded in a second set of consecutive tracks.

9 Claims, 21 Drawing Sheets

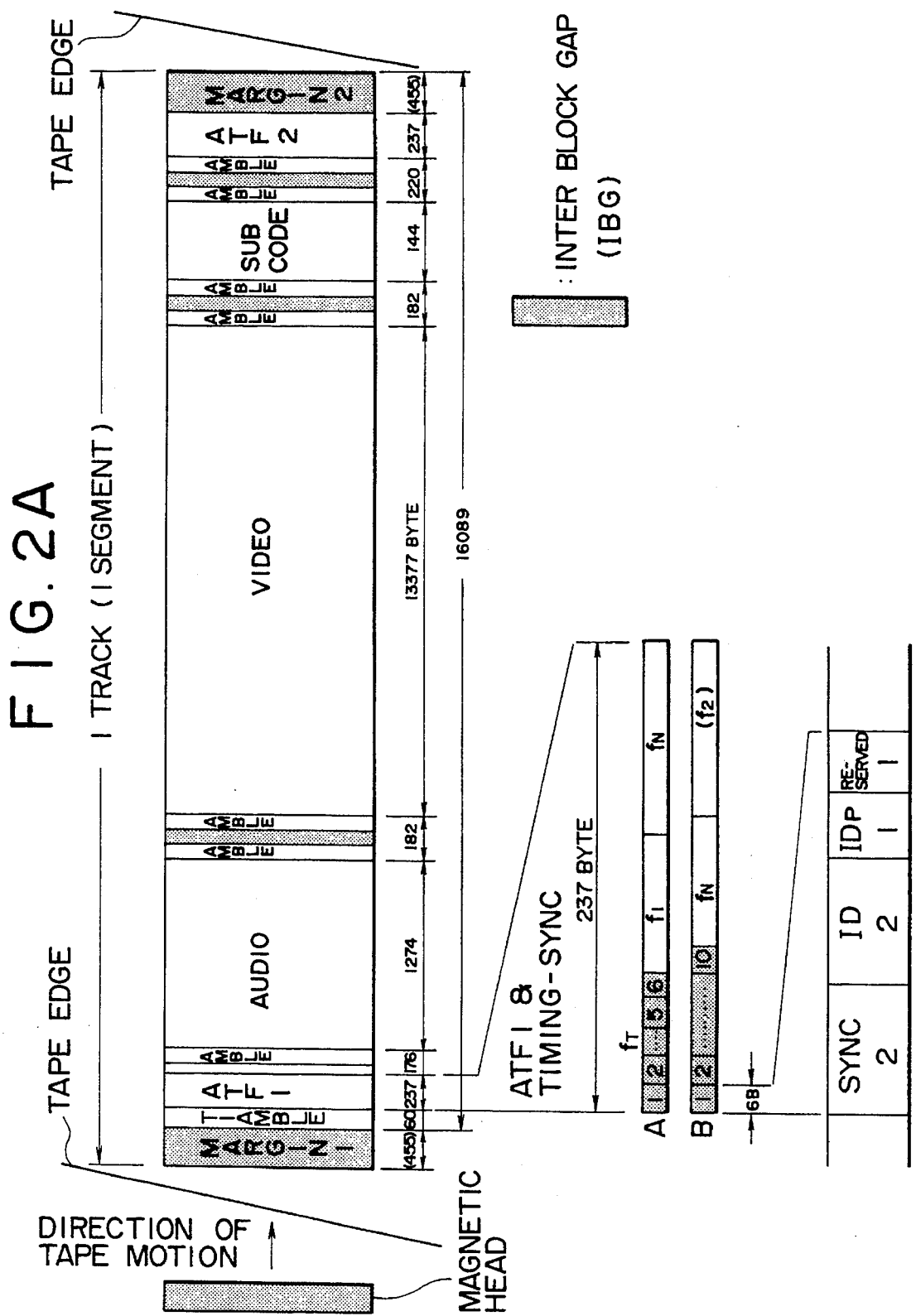

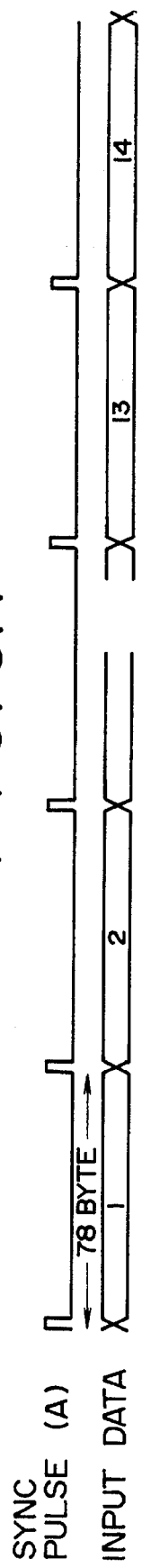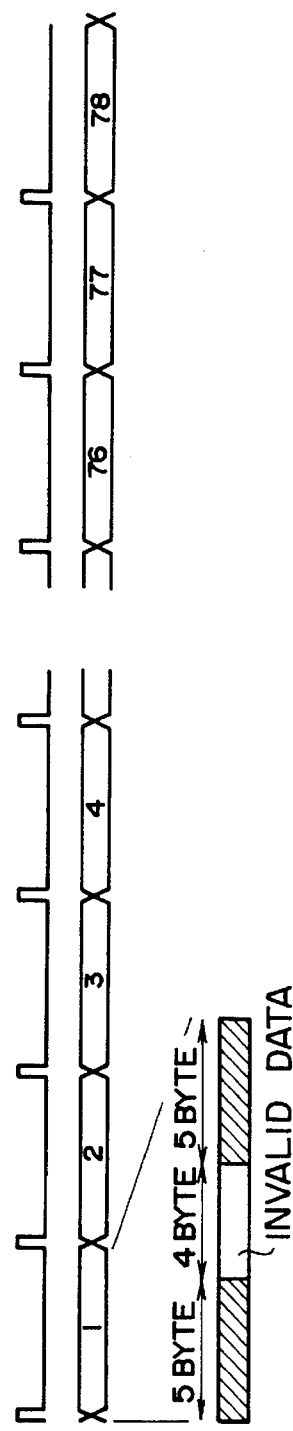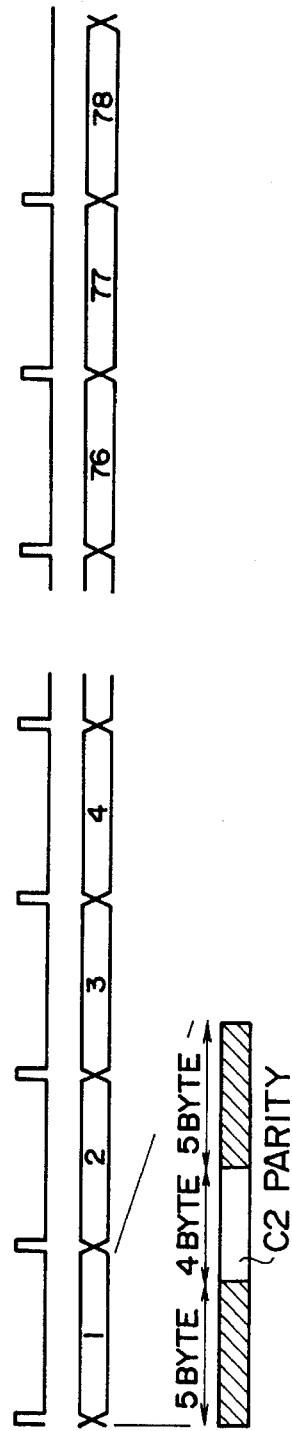

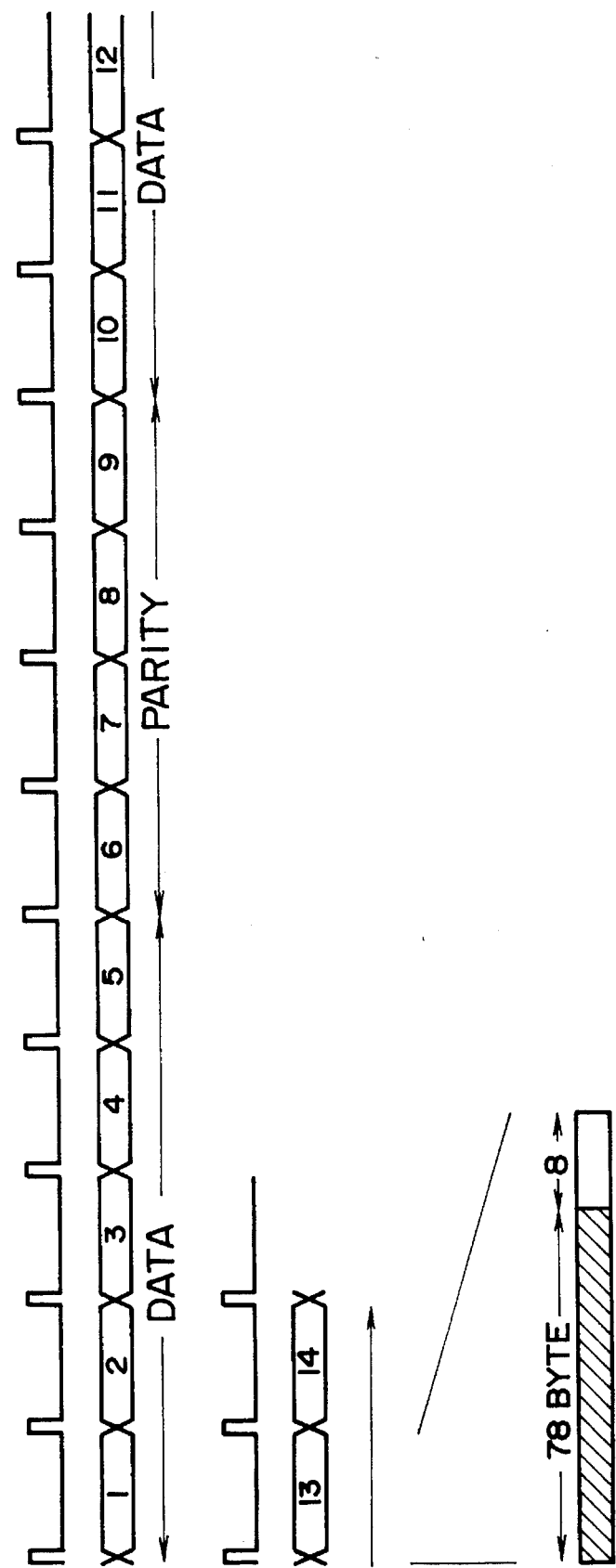

8 PIXELS

METHOD AND APPARATUS FOR RECORDING DIGITAL DATA ON A RECORDING MEDIUM BY RECORDING ODD-NUMBERED AND EVEN-NUMBERED DATA SEGMENTS AND COMPRESSED DIGITAL DATA IN DISTINCT RECORDING REGIONS

This application is a continuation of application Ser. No. 08/074,480, filed Jun. 11, 1993, now abandoned.

BACKGROUND OF THE INVENTION

The present invention relates to a method of and apparatus for digitally recording data such as a video signal on a recording medium such as a magnetic tape.

In U.S. patent application Ser. No. 784,720, now abandoned, corresponding to Japanese Patent Application No. Hei 2 (1990)-294672, the assignee of the present invention proposed a digital video tape recorder using a track format as shown in FIG. 1A. In this format, an automatic track following (ATF) or pilot signal is recorded at the beginning of each track, followed by video and audio data in a video and audio data region formed of sync blocks. Additional audio data may be recorded in a separate region subsequent to the video and audio region. Subdata (a subcode) follows the separate audio data region.

As shown in FIG. 1B, in each sync block, in the region where both video and audio data are recorded, the video data is positioned before the audio data.

In U.S. patent application Ser. No. 899,615, now U.S. Pat. No. 5,424,850, corresponding to Japanese Patent Application No. Hei 3 (1991)-153403, the assignee of the present invention proposed interleaving of the audio data recorded in a recording region dedicated exclusively for audio data. However, in this proposed format, the audio data are positioned contiguously. Consequently, if there is a flaw or a series of erroneous data on the magnetic tape or a dropout in the reproduced signal, it is difficult to reproduce the data properly. Specifically, error correction is difficult to perform, and so a reproduced signal is likely to include noise when such a flaw is present in the magnetic tape or dropout occurs in the reproduced signal.

OBJECTS AND SUMMARY OF THE INVENTION

Therefore, an object of the present invention is to provide a method and apparatus for recording data which avoids the aforementioned disadvantages of the prior art.

It is another object of the present invention to provide a format for recording digital data which reduces noise vulnerability in a reproduced signal.

It is yet another object of the present invention to provide a digital data recording format which reduces the vulnerability of the information recorded in this format to a flaw or the like on a recording medium.

In accordance with one aspect of this invention, there is provided a method of recording digital data in a plurality of tracks on a recording medium, comprising the steps of separating the digital data into odd-numbered data and even-numbered data, recording the odd-numbered data in a first region on each track, and recording the even-numbered data in a second region on each track, the second region being distinct from the first region. At least one of parity data and auxiliary data may be recorded in a third region on each track, the third region being located between the first and second regions. The digital data represents two channels, and data for a first channel is recorded on a first set of consecutive tracks, while data for a second channel is recorded on a second set of consecutive tracks following the first set.

In accordance with another aspect of this invention, there is provided a recording medium having tracks each including a video area for recording video data and an audio area for recording audio data, and having audio data recorded thereon by the steps of separating the audio data into odd-numbered data and even-numbered data, recording the odd-numbered data in a first region of the audio area of each track, and recording the even-numbered data in a second region of the audio area of each track.

In accordance with a further aspect of this invention, there is provided an apparatus for recording audio data for two channels on tracks of a recording medium. The apparatus separates the audio data for each of the two channels into odd-numbered data and even-numbered data, generates parity data for a predetermined amount of the audio data for each of the two channels, and records the odd-numbered data for one channel in a first region of each of the tracks in a first set of consecutive tracks, the even-numbered data for the one channel in a second region of each of the tracks in the first set, the odd-numbered data for the other channel in the first region of each of the tracks in a second set of consecutive tracks, the even-numbered data for the other channel in the second region of each of the tracks in the second set, and at least one of parity data or auxiliary data in respective third regions of each of the tracks in the first and second sets, the third region being between the first and second regions.

In accordance with yet another aspect of this invention, there is provided an apparatus for recording video data and audio data for two channels in tracks on a recording medium. The apparatus compresses the video data, records the compressed video data in a video area of each of the tracks, and separates the audio data into odd-numbered data and even-numbered data for each of the two channels. The apparatus generates parity data for a predetermined amount of the audio data for each channel, and records the odd-numbered data for one channel in a first region of an audio area of each of the tracks in a first set of consecutive tracks, the even-numbered data for the one channel in a second region of the audio area of each of the tracks in the first set, the odd-numbered data for the other channel in the first region of the audio area of each of the tracks in a second set of consecutive tracks, the even-numbered data for the other channel in the second region of the audio area in each of the tracks in the second set, and at least one of parity data or auxiliary data in a third region of each of the tracks in the first and second sets, the third region being between the first and second regions.

In accordance with an additional aspect of this invention, there is provided an apparatus for reproducing audio data recorded with parity data in tracks on a recording medium, the audio data having an original sequence different from its recorded sequence. The apparatus reproduces the audio data from first and second regions on the tracks and the parity data from third regions on the tracks, and performs error correction on the reproduced audio data using the reproduced parity data. The apparatus combines error corrected audio data reproduced from the first regions with error corrected audio data reproduced from the second regions to produce audio data in the original sequence. The reproducing apparatus then interpolates the audio data reproduced from one of the first and second regions to correct errors in the audio data reproduced from the other of the first and second regions.

The above, and other objects, features and advantages of the present invention will be apparent in the following detailed description of the preferred embodiments of the present invention when read in conjunction with the accompanying drawings in which corresponding parts are identified by the same reference numeral.

BRIEF DESCRIPTION OF THE DRAWINGS

FIGS. 2A–2E are diagrams showing a track format for a magnetic tape according to the present invention;

FIGS. 6A–6D are timing charts referred to in explaining the operation of the circuit shown in FIG. 5;

DETAILED DESCRIPTION OF THE PREFERRED EMBODIMENTS

Figure 1A:
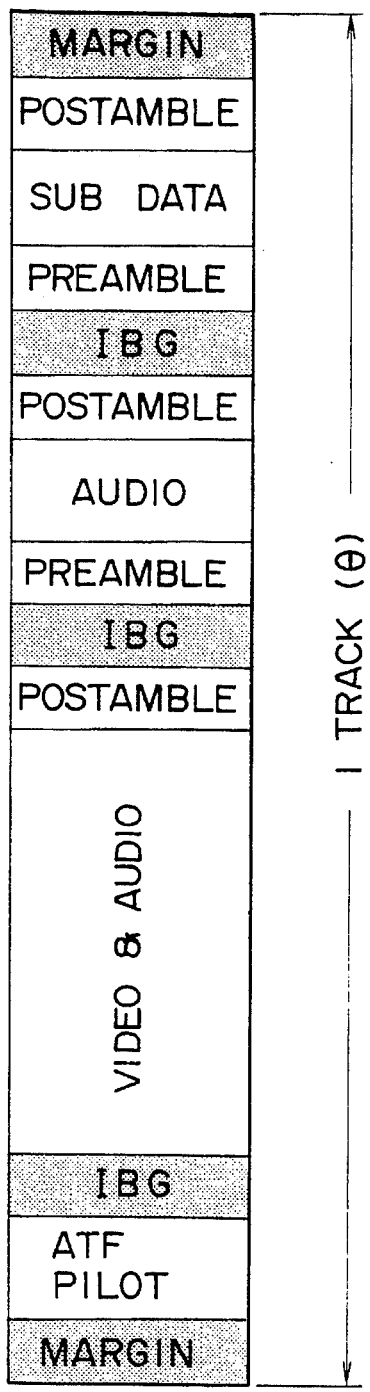
FIGS. 1A and 1B are diagrams showing a track format for a magnetic tape in a previously proposed digital video tape recorder.
Figure 1B:
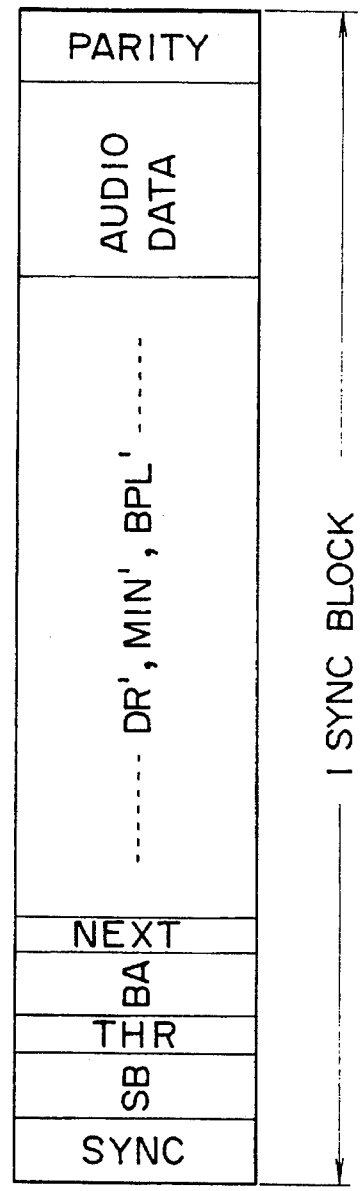

Referring now to the drawings, and in particular to FIGS. 2A–2E, there is illustrated a track format for a magnetic tape used as a recording medium in a digital video tape recorder according to the present invention. In, for example, the NTSC system, one frame of video data is recorded in 10 tracks of this format.

As shown in FIG. 2A, a magnetic head traverses the length of each track, from the left to the right of the diagram. First and second margin regions are formed by the first 455 bytes and the last 455 bytes of each track, at the left side of the track where the magnetic head initially contacts the tape and the right side of the track where the magnetic head is separated from the magnetic tape, respectively. Data of length of 16,089 bytes are recorded between these two margin regions.

Following the first margin region, a preamble of 60 bytes is recorded. (For convenience, the preambles and postambles which are recorded are referred to herein generically as "ambles".) Since this amble is recorded immediately after contact of the magnetic head, it is slightly longer than other ambles on the track in consideration of the pull-in time needed to synchronize a phase-locked loop (PLL) which generates clock pulses.

A pilot signal region ATF1 is formed in the next 237 bytes. In this region, tracking pilot signals f1, f2, fN and a timing-sync signal fT are recorded. More specifically, in a channel-A track, the sync signal fT, having a length of six bytes, is recorded six times in a first portion of 6×6=36 bytes, while in a channel-B track, the sync signal fT is recorded ten times in a first portion of 10×6=60 bytes. In the remaining portion of the channel-A track, the tracking pilot signals f1 and fN are recorded. In the remaining portion of the channel-B track, the tracking pilot signals fN and f2 are recorded. In this example, the pilot signal f2 is recorded in one track of each set of four tracks, while the pilot signal fN is recorded in the remaining three tracks of each set of four tracks. (As will be appreciated, a channel-A track is recorded by, for example, head 17A of FIG. 10, described below and a channel-B track is recorded by head 17B).

In each sync signal fT, the first two bytes are used for sync data, the next two bytes for ID data, and the following byte for ID parity data (IDP). The remaining byte r is reserved for future use.

Table 1 shows ID data, including flags (SP/LP) representing either an SP mode providing a "standard play" recording time for the magnetic tape or an LP mode providing a "long play" recording time for the magnetic tape; two bits of data (RTYPE1, RTYPE0) indicating the nature of the following data, that is, video, audio or subcode data; and five bits of data (SYNC0 to SYNC4) identifying the position (sync number) relative to the beginning of the present timing-sync signal fT, namely, which one of the six (channel-A) or ten (channel-B) timing sync signals fT the present sync signal represents.

TABLE 1

| SP/LP | RESERVED |
|---|---|
| RESERVED | RESERVED |
| RTYPE 1 | RESERVED |
| RTYPE 0 | SYNC 4 |
| RESERVED | SYNC 3 |
| RESERVED | SYNC 2 |
| RESERVED | SYNC 1 |
| RESERVED | SYNC 0 |

Channel-A tracks and channel-B tracks are recorded alternately on the magnetic tape. During playback of the channel-A track by the magnetic head, the pilot signal f1 is detected. After a lapse of a predetermined time from detection of the pilot signal f1, the pilot signal f2 is detected as a crosstalk component from the adjacent track. The length (or duration) of the pilot signal f1 is set so as to be shorter at detection of the pilot signal f2 from the right adjacent track of the channel B, and to be longer at detection of the pilot signal f2 from the left adjacent track of the channel B.

Tracking control involves determining the length of the pilot signal f1, to identify whether the pilot signal f2 detected thereafter is a crosstalk component from the right or left adjacent track. The level of the crosstalk component from the right adjacent track of the pilot signal f2 is sampled and held. During reproduction of the next channel-A track, the level detected as the crosstalk component from the right adjacent track of the channel B is sampled and held. A control operation is then performed to equalize the two held levels.

After the pilot signal region ATF1, a second amble region is formed in a region of length 176 bytes. A beginning portion of this amble region is an interblock gap (IBG) of length 131 bytes. The remainder of this amble region is a clock signal of length 45 bytes used for reproducing audio data in a following recording region used exclusively for audio data.

The exclusively audio data region or area, shown in FIGS. 2B–2C and discussed in detail below, has a length of 1,274 bytes and is used for recording audio data without compression. The audio data may be recorded in an after-recording mode. For example, this region may be used for recording digital data obtained by sampling two channel analog audio signals at a sampling frequency of 48 kHz with 16 quantization bits, or, alternatively, for recording digital data obtained by sampling four channel analog audio signals at a sampling frequency of 32 kHz with 12 quantization bits.

The exclusively audio data recording region is an optional part of the track format of FIG. 2A. If there is no need for recording and reproducing a high-definition audio signal, the corresponding circuit can be eliminated to realize a lower-cost apparatus.

Following the exclusively audio data region, there is an amble region of length of 182 bytes, comprising a postamble region for the exclusively audio data region of length six bytes, an IBG region of length 131 bytes, and a preamble region for a subsequent video and audio data region of length 45 bytes.

The video and audio data recording region or area, shown in FIG. 2D and discussed in detail below, has a length of 13,377 bytes and is used for recording video data compressed by, e.g., a discrete cosine transform (DCT), and audio data compressed by, e.g., DPCM. The audio data portion of this region is mandatory, i.e., is not an optional part of the track format, so that even if the exclusively audio data region is not provided, both video and audio reproduction are still possible by reproducing the audio data recorded together with the video data in this recording region.

If the magnetic tape vibrates immediately after contact with the magnetic head, and no audio data is recorded in the exclusively audio data recording region, then there is no effect on the reproduced data. On the other hand, if audio data are recorded in the exclusively audio data region, the resultant harm, if any, is smaller than the harm which would occur if the video and audio data recording region were located near the beginning of a track, since the frequencies of the audio data are lower than those of the video data. Therefore it is preferred that the exclusively audio data recording region precede the video and audio data recording region.

Following the video and audio data recording region, there is a third amble region of length 182 bytes. Similarly to the second amble region preceding the video and audio data region, this amble region is comprised of a six byte post-amble region, a 131-byte IBG region and a 45-byte preamble region.

Following the third amble region, there is a subcode recording region or area having a length of 144 bytes and used for recording data and a time code which permit rapid track access. The third amble region includes a subcode annexed to the video data recorded in the video and audio data recording area or to the audio data recorded in the exclusively audio data region.

Following the subcode recording region, there is a fourth amble region having a length of 220 bytes. The fourth amble region includes a 44-byte postamble region following the subcode recording region, a 131-byte IBG region, and a 45-byte preamble region preceding the subsequent pilot signal region ATF2.

The pilot signal region ATF2 has a length of 237 bytes, and has recorded therein similar data as is recorded in the pilot signal region ATF1.

Figure 2B:
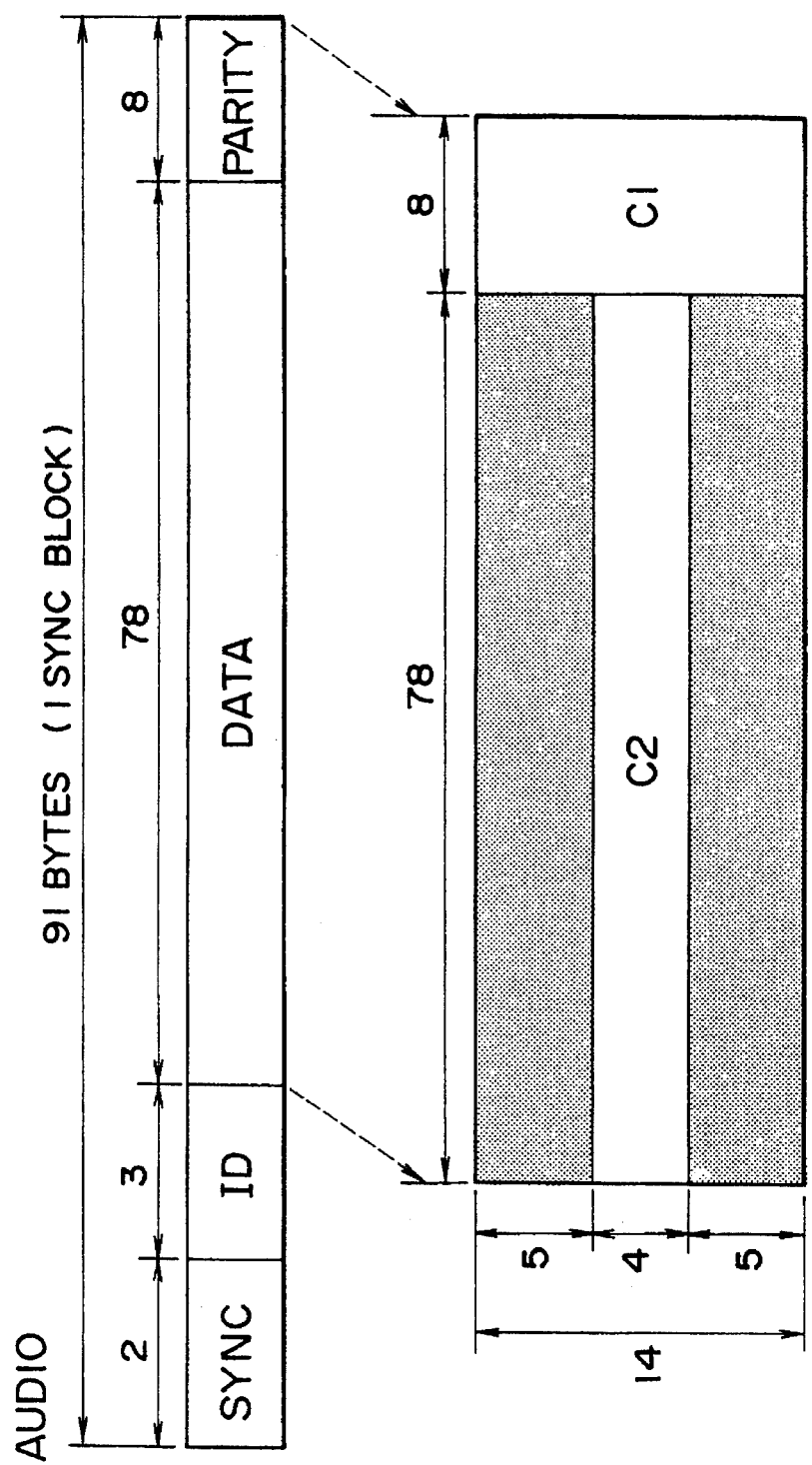
Figure 2C:
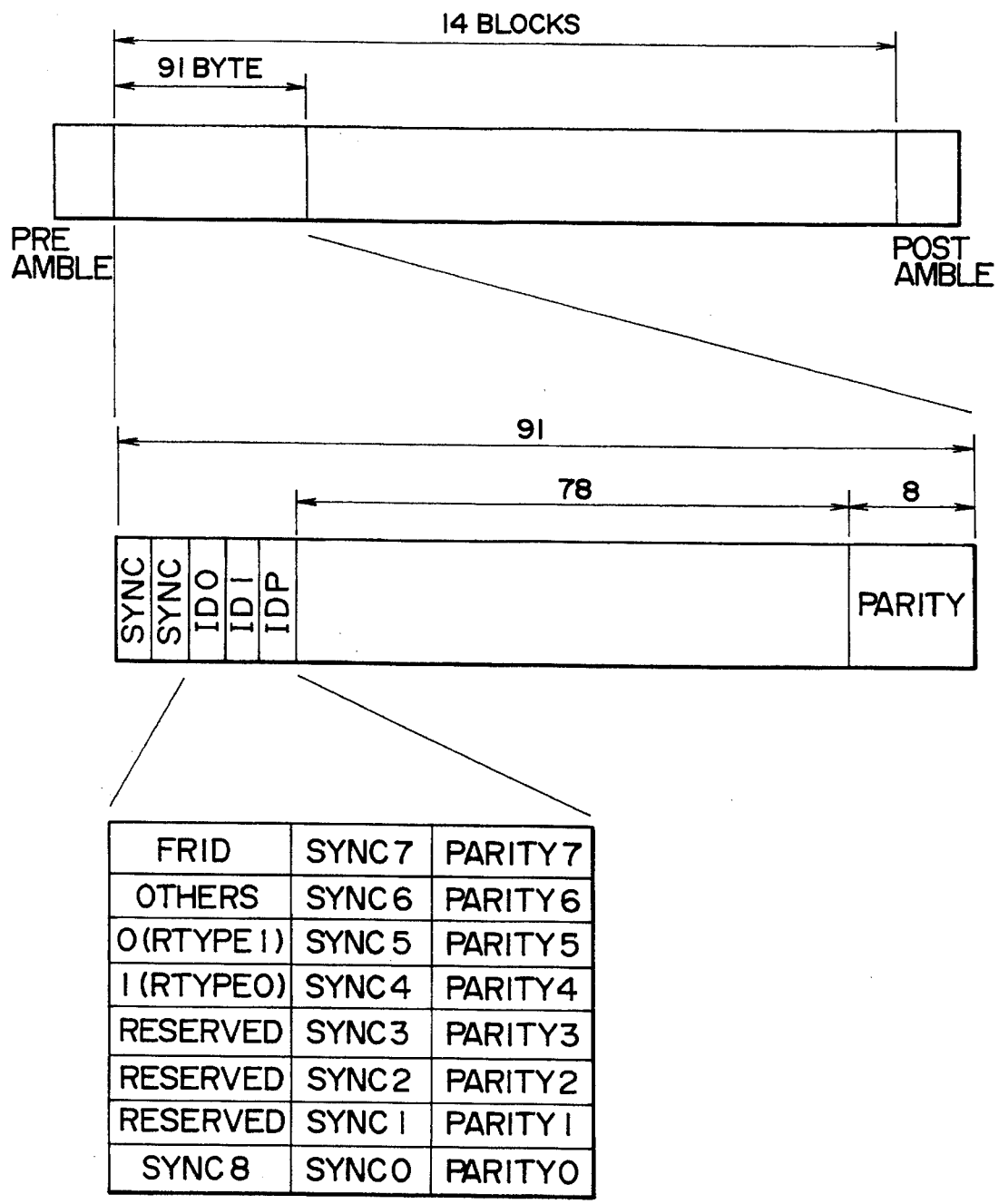
Figure 2D:
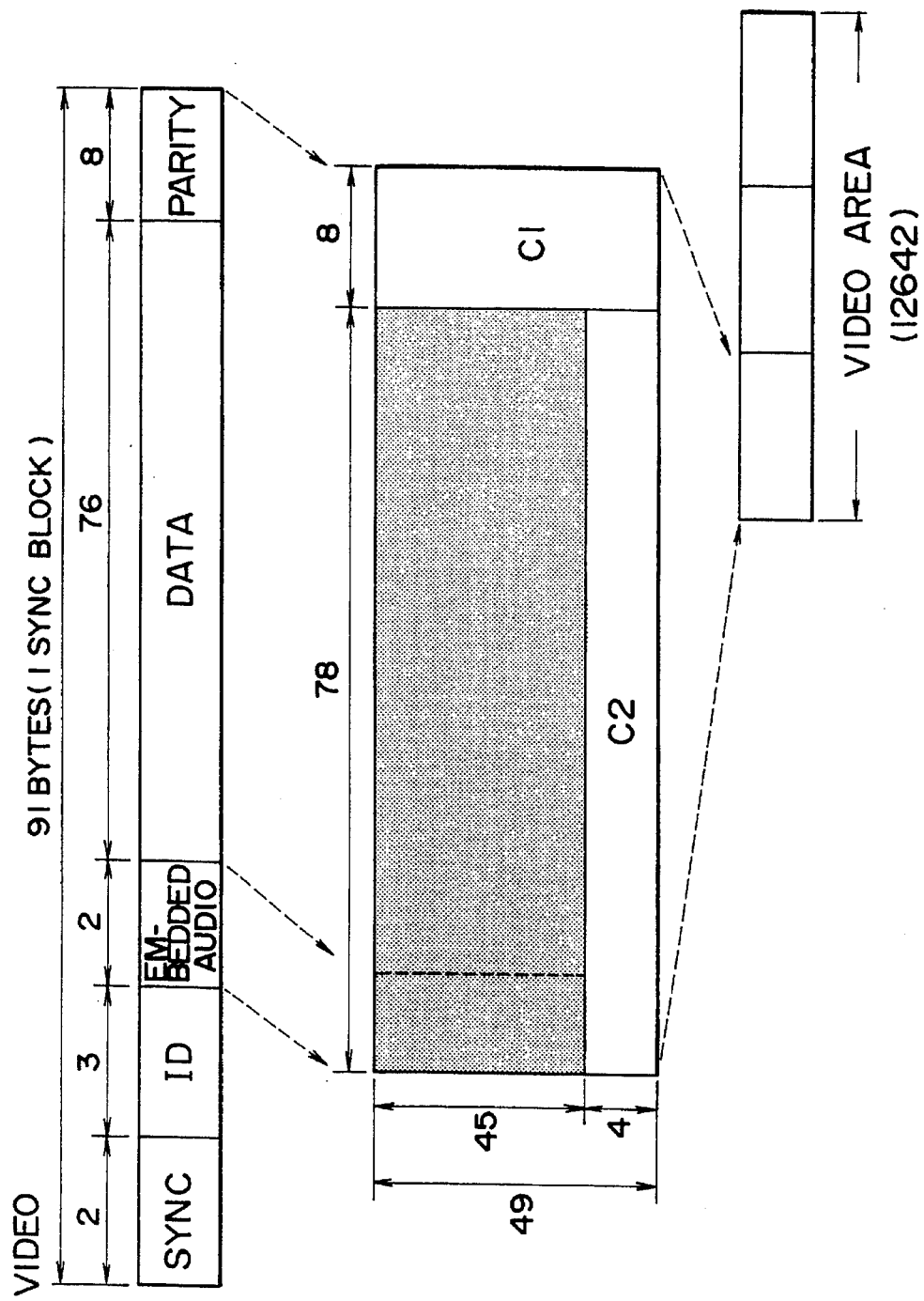

FIG. 2D shows the format of the video and audio data recording region. As mentioned, this region has a length of 13,377 bytes, and includes three blocks each having 49×(2+76 8)=4,214 bytes of audio, video and parity data, and 49×(2+3)=245 bytes of sync and ID data.

The video and audio data are recorded in sync blocks, each having a length of 91 bytes. At the beginning of each sync block, there are two bytes of sync data, three bytes of ID data and two bytes of compressed audio data, also referred to as embedded audio data. Following the audio data, video data are recorded in a length of 76 bytes. At the end of each sync block, there is an area of length eight bytes used for recording parity data.

The audio, video and parity data from 49 sync blocks comprise a product code. Both a horizontal parity C1 and a vertical parity C2 are generated in this product code to permit higher-precision correction than previously possible. In this embodiment, 45 sync blocks are used for the audio, video and horizontal parity C1 data, while 4 sync blocks are used for the vertical parity C2. As can be seen, the last eight bytes of each of the vertical parity blocks are used for horizontal parity data.

FIGS. 2B and 2C show the format of the exclusively audio data recording region. As can be seen from FIG. 2C, the audio data are recorded in sync blocks, each having a length of 91 bytes. At the beginning of each sync block, there are two bytes of sync data and three bytes of ID data, including a frame ID (FRID), two bits (RTYPE0, RTYPE1) representing the kind of recorded content in the block (e.g., "01" for audio), nine bits (SYNC0 to SYNC8) indicating the sync position (sync number) of the block in the frame, and one byte (IDP) used for ID parity. After the ID data, there is a region of length 78 bytes in which high-definition (uncompressed) exclusively audio data may be recorded. At the end of each sync block, there is an area of length eight bytes used for recording parity data.

By using sync blocks of the same length and substantially the same composition for the exclusively audio data and the video and audio data, the configuration of the exclusively audio data processing circuit may be substantially the same as the configuration of the video and audio data processing circuit, which simplifies the hardware design.

As shown in FIG. 2B, the exclusively audio and parity data from fourteen sync blocks comprise a product code.

Both a horizontal parity C1 and a vertical parity C2 are generated in this product code to permit higher-precision correction than previously possible. In this embodiment, ten sync blocks are used for the exclusively audio and horizontal parity C1 data, while 4 sync blocks are used for the vertical parity C2. As can be seen the last eight bytes of each of the vertical parity blocks are used for horizontal parity data. The vertical parity C2 blocks are positioned between the exclusively audio blocks, with five exclusively audio blocks above the vertical parity and five exclusively audio blocks below the vertical parity.

Figure 2E:
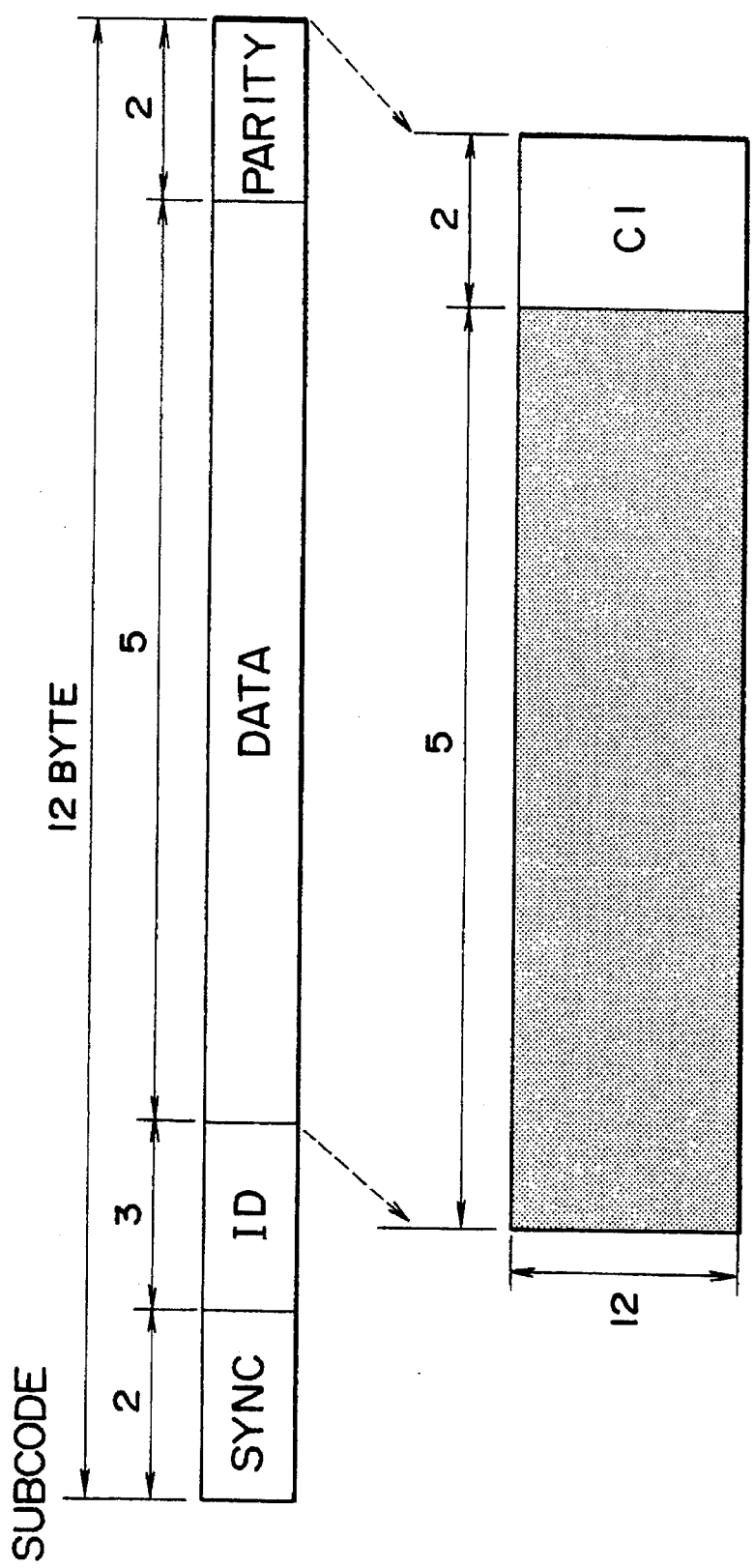

FIG. 2E shows a format for the subcode recorded in the subcode recording region of FIG. 2A. A sync block having a length of 12 bytes serves as a recording unit, wherein the first 2 bytes are used for sync, the next 3 bytes for ID, the following 5 bytes for recording the subcode data, and the final 2 bytes for parity. For the subcode, 12 sync blocks each having a length of 12 bytes are grouped to constitute a product code. However, only horizontal parity C1 alone is utilized in the subcode recording region.

Figure 3:
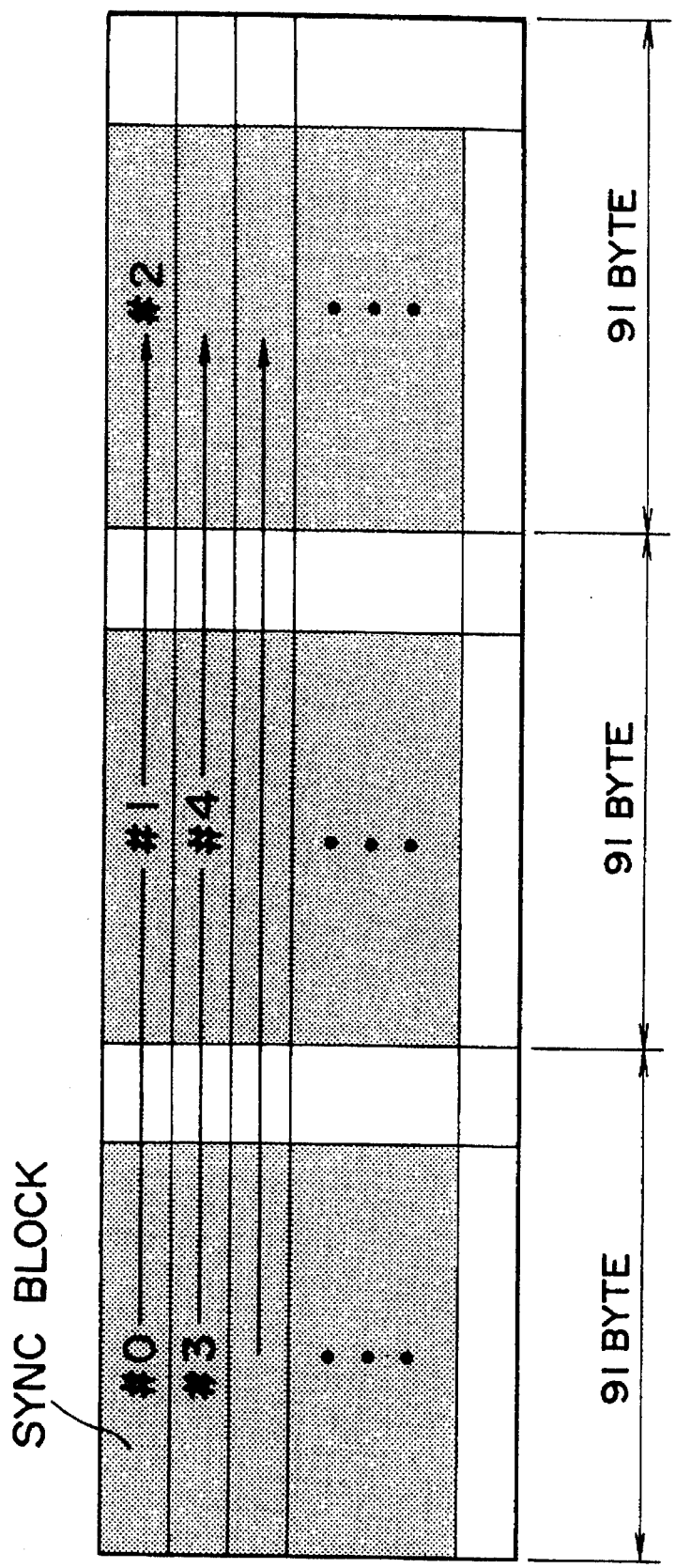
FIG. 3 illustrates the sequence of recording the product code shown in FIGS. 2B and 2D.

As shown in FIG. 3, three blocks of the exclusively audio data product code shown in FIG. 2B, or the video and audio data product code shown in FIG. 2D, are grouped, and sequentially recorded in one track in distinct areas so as to position the product code data in separate regions. More specifically, the sync blocks are sequentially numbered, beginning with #0. The #0 sync block is located in the left region of a first track. Similarly, the #1 sync block is positioned in the center region of the first track, and the #2 sync block is placed in the right region of the first track. In the second track, the #3, #4 and #5 sync blocks are recorded in respective regions. The data are thus rendered discrete, that is, placed in separate regions, by such recording procedure, so that reproduction of the data can be facilitated in case damage to the magnetic tape occurs.

Figure 4:
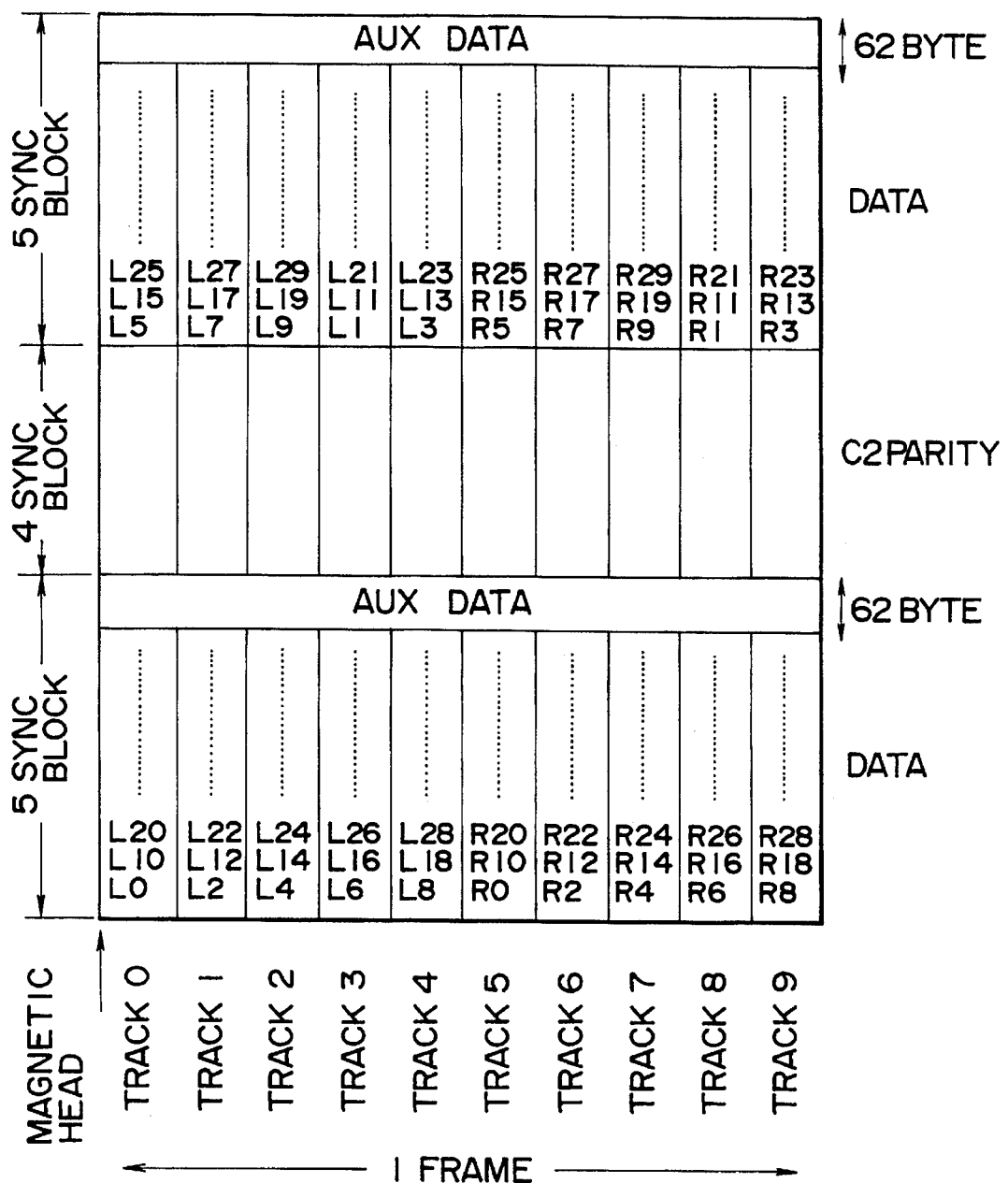
FIG. 4 is a diagram illustrating a track format for recording one frame of exclusively audio data in NTSC format according to the present invention.

When the product code of the exclusively audio data having the vertical parity C2 positioned at the center thereof, as shown in FIG. 2B, is recorded on the magnetic tape in the sequence shown in FIG. 3 with appropriate interleaving, the format of the tracks on the magnetic tape is as shown in FIG. 4.

In the embodiment of FIG. 4, one frame of NTSC exclusively audio data is recorded on 10 tracks (TRACK0 to TRACK9). The left (L)-channel audio data is recorded on the first 5 tracks (TRACK0 to TRACK4), while the right (R)-channel audio data is recorded on the next 5 tracks (TRACK5 to TRACK9). Due to this arrangement in which the data for the left and right channels are recorded separately, an after-recording operation can be performed for each of the two channels individually.

An upper exclusively audio data recording region is formed where the magnetic head begins to scan the track, shown on the lower part of FIG. 4, and has recorded therein sampling data (L0, L2, L4, . . . , R0, R2, R4, . . . ), referred to herein as even-numbered data segments. A segment preferably is one byte of data, but could be more or less than this amount.

A lower exclusively audio data recording region is formed just before the magnetic head finishes scanning the track, as shown on the upper part of FIG. 4, and has recorded therein sampling data (L1, L3, L5, . . . , R1, R3, R5, . . ., referred to herein as odd-numbered data segments. The data in the lower audio region is interleaved, with the interleaved tracks for the left channel preceding the interleaved tracks for the right channel.

The upper and lower regions in the exclusively audio data recording area of each track are distinct. A region for recording the vertical parity C2 is formed between these upper and lower regions.

With the blocks arranged as shown in FIG. 4, having the vertical parity C2 positioned at the center, even if the audio data in one region (e.g., the upper 5 sync blocks) are destroyed, the audio data in the other region (e.g., the lower 5 sync blocks) remains available. The destruction of the data in one region may be compensated by interpolating the audio data in the other region so as to produce signals resembling the original signals before the destruction occurred. The thus interpolated signals are used in place of the signals from the destroyed region in a reproduced signal.

The interval between the upper and lower data recording regions has a relatively long length so as to minimize the number of times audio data is destroyed in both the upper and lower regions due to, for example, a flaw in the magnetic tape extending from the upper to the lower region. In the embodiment of FIG. 4, an auxiliary (AUX) data recording region follows each of the audio data recording regions, lengthening the interval between the two audio data recording regions. The auxiliary data AUX may represent, for example, text of a character broadcast.

It is possible to further lengthen the interval between the two audio data recording regions by positioning the AUX data recording regions together between the audio data recording areas, that is, positioning all of the upper and lower AUX data regions and the parity data recording region between the audio data recording regions.

The above-described procedure of positioning the vertical parity C2 at the center to increase the interleave distance is employed in the conventional digital audio tape recording system (R-DAT).

In a conventional system, the vertical parity C2 is defined so that the parity data is positioned at the center. More specifically, the C2 code is conventionally expressed as $$D_9X^{13} + D_8X^{12} + D_7X^{11} + D_6X^{10} + D_5X^9 + \quad \quad (A1)$$
$$P_3X^8 + P_2X^7 + P_1X^6 + P_0X^5 +$$
$$D_4X^4 + D_3X^3 + D_2X^2 + D_1X^1 + D_0X^0$$

where $D_9, D_8, \ldots D_0$ denote the audio data; and $P_3, P_2, P_1, P_0$ denote the parity data.

Figure 5:
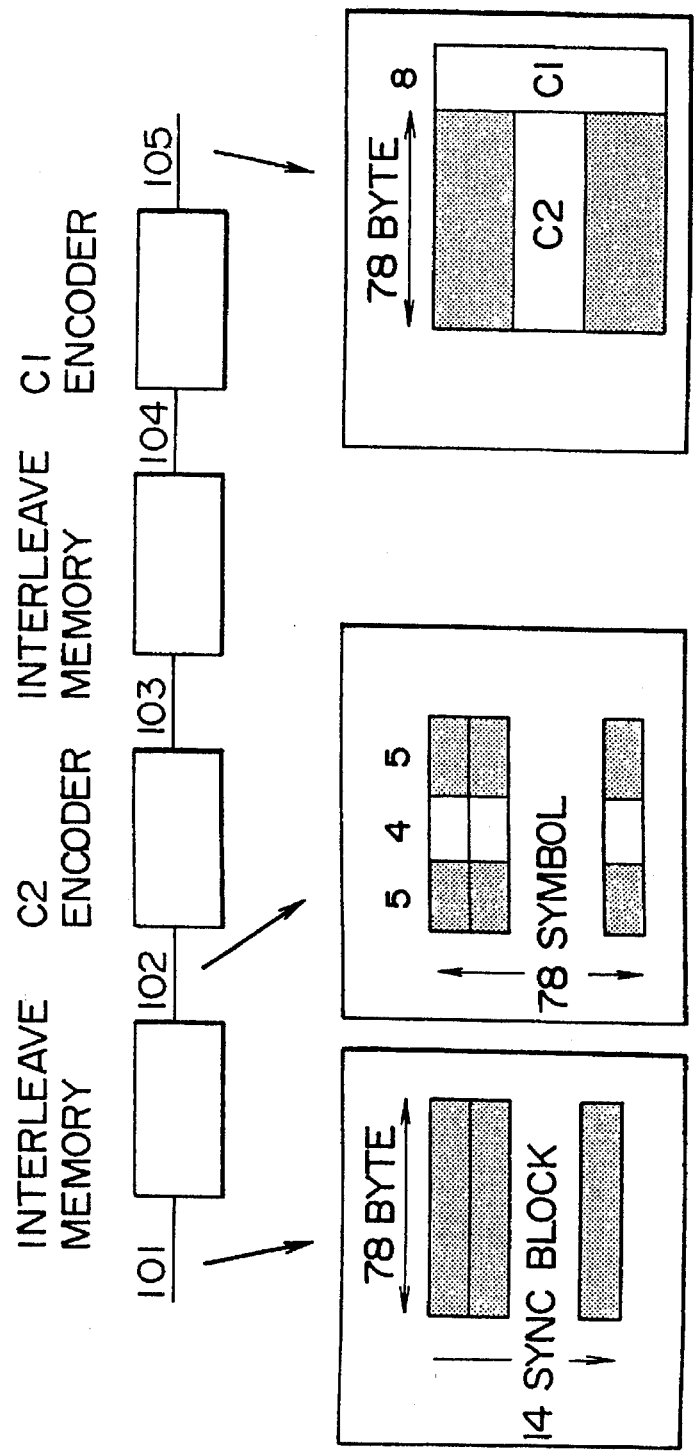
FIG. 5 is a block diagram showing a circuit for adding parity.

In the conventionally-used recording circuit shown in FIG. 5, data 101 for the exclusively audio sync blocks of FIG. 2B are inputted to an interleave memory. The input timing is as shown in FIG. 6A, namely, a sync pulse representing a delimiter of a portion of the product code rises at a timing of every 78 bytes so that the data of a sync block is processed in response to each sync pulse.

The thus input audio data is interleaved in the memory and then supplied as data 102, at the timing shown in FIG. 6B, to a C2 encoder. Each of the 14 bytes of data 102 includes four bytes of invalid data, used as a placeholder for data which is not yet available, and 10 bytes of audio data consisting of five bytes preceding and five bytes following the four bytes of invalid data. A sync pulse rises at every 14 bytes of the C2 code, corresponding to the vertical amount of the data in FIG. 2B, and the 14 bytes of C2 data are transmitted in accordance with such sync pulse.

The C2 encoder generates parity data C2 and places it in the invalid data area, to form data 103, as shown in FIG. 6C. The data 103 is supplied to an interleave memory, interleaved, and then inputted as data 104 to a C1 encoder. The data 104 comprises 78 bytes of exclusively audio data or vertical parity data C2 for one sync block, followed by eight bytes of invalid data, as shown in FIG. 6D. The C1 parity encoder generates parity data C1 and substitutes the parity data C1 for the eight bytes of invalid data, to form data 105, as shown in FIG. 5.

In the present invention, the C2 code is formed as expressed by Eq. A2 below, where the parity data is positioned at the end of the audio data:

$$D_9X^{13} + D_8X^{12} + D_7X^{11} + D_6X^{10} + D_5X^9 + \quad (A2)$$
$$D_4X^8 + D_3X^7 + D_2X^6 + D_1X^5 + D_0X^4 +$$
$$P_3X^3 + P_2X^2 + P_1X6^1 + P_0X^0$$

Figure 7:
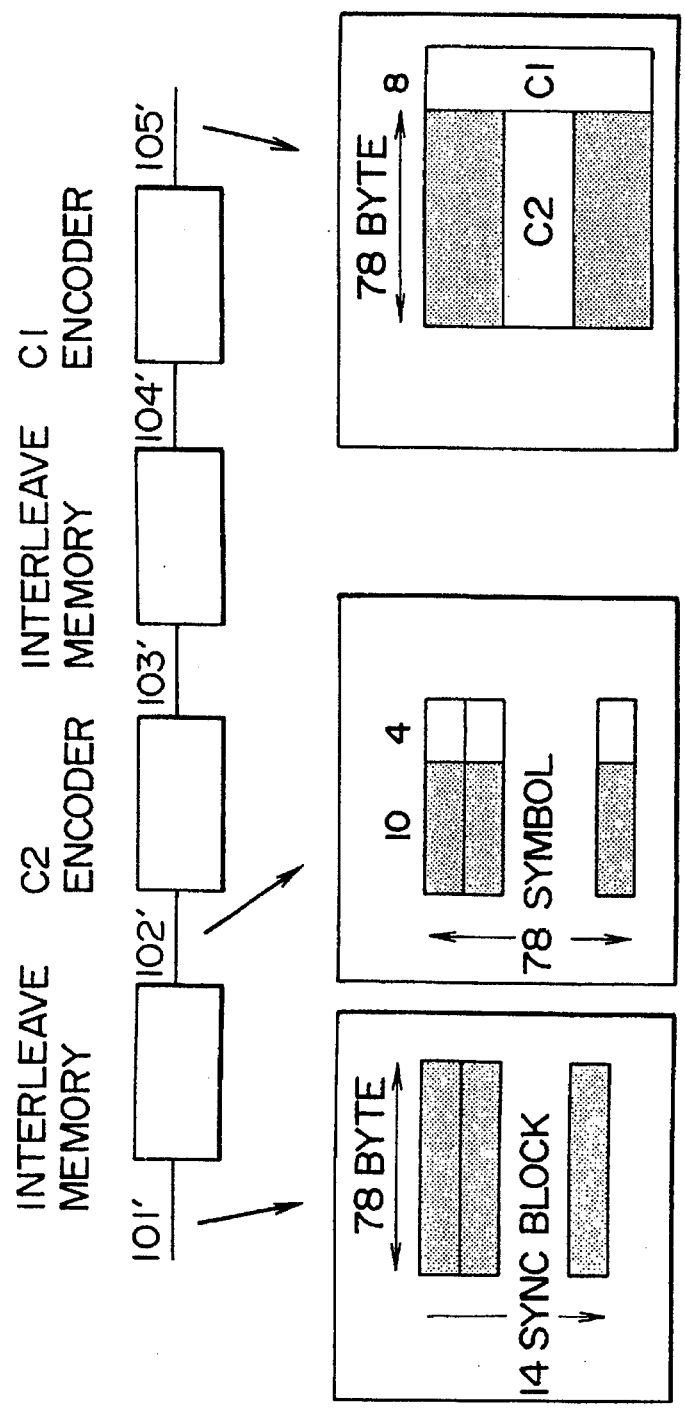
FIG. 7 is a block diagram showing a circuit for adding parity according to the present invention.

In a recording circuit according to the present invention shown in FIG. 7, input data 101' having the same format as shown in FIG. 5 are supplied to an interleave memory. However, the output from the interleave memory, supplied as data 102' to a C2 encoder, has a format different than that of data 102.

Figure 8A:
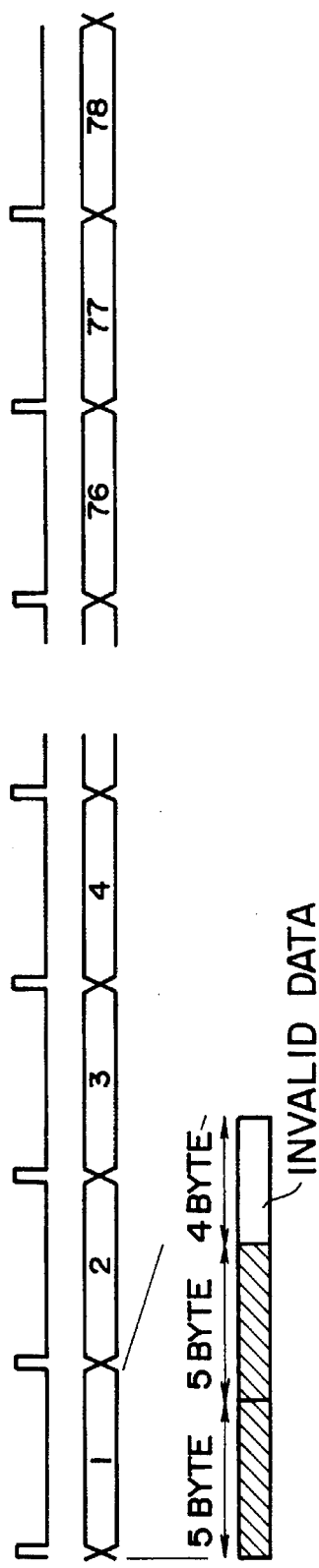
FIGS. 8A–8B are timing charts referred to in explaining the operation of the circuit shown in FIG. 7.
Figure 8B:
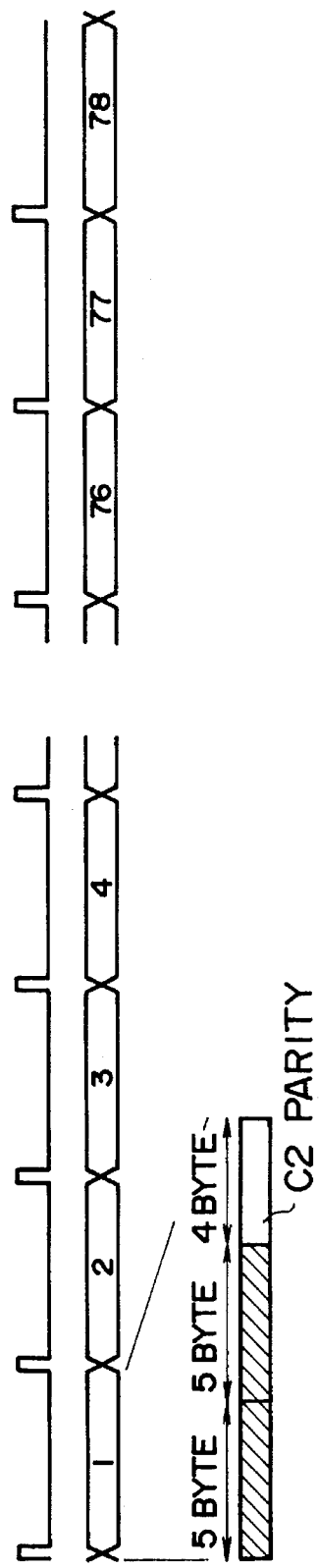

As shown in FIG. 8A, the 14 bytes inputted to the C2 encoder includes 10 contiguous bytes of audio data followed by four bytes of invalid data. The C2 encoder generates parity data C2 for the data 102' supplied thereto, and replaces the invalid data with the parity data C2 generated therein, and supplies the result as data 103' shown in FIG. 8B

In a similar manner as in the circuit of FIG. 5, the data 103' of FIG. 7 is supplied to an interleave memory, interleaved, and then inputted as data 104' to a C1 encoder. The data 104' comprises 78 bytes of exclusively audio data or vertical parity data C2 for one sync block, followed by eight bytes of invalid data. The C1 parity encoder generates parity data C1 and substitutes the parity data C1 for the eight bytes of invalid data to form data 105', as shown in FIG. 7.

In a conventional parity generating circuit such as shown in FIG. 5, when parity data is generated at encoding (recording) time, an error correction must be executed in an erasure correction mode with the parity portion as an error. This procedure renders the hardware design complicated since the entire hardware used during playback must also be used during recording to encode the data.

In the present invention, the parity generating circuit can be a relatively simple configuration, such as a divider that divides the input data by a polynomial to generate the C2 code. Thus, a parity generating circuit according to the present invention can be of extremely small hardware size in comparison with the conventional parity generating circuit.

The present invention reduces energy use in the recording mode, since it permits use of a simpler and smaller circuit, which advantageously increases the available shooting time for a camera having a limited power supply.

It will be appreciated that separating the audio data into odd and even numbered data is accomplished during the interleaving which occurs when the data is written to and read from a memory in respectively different sequences.

Figure 9:
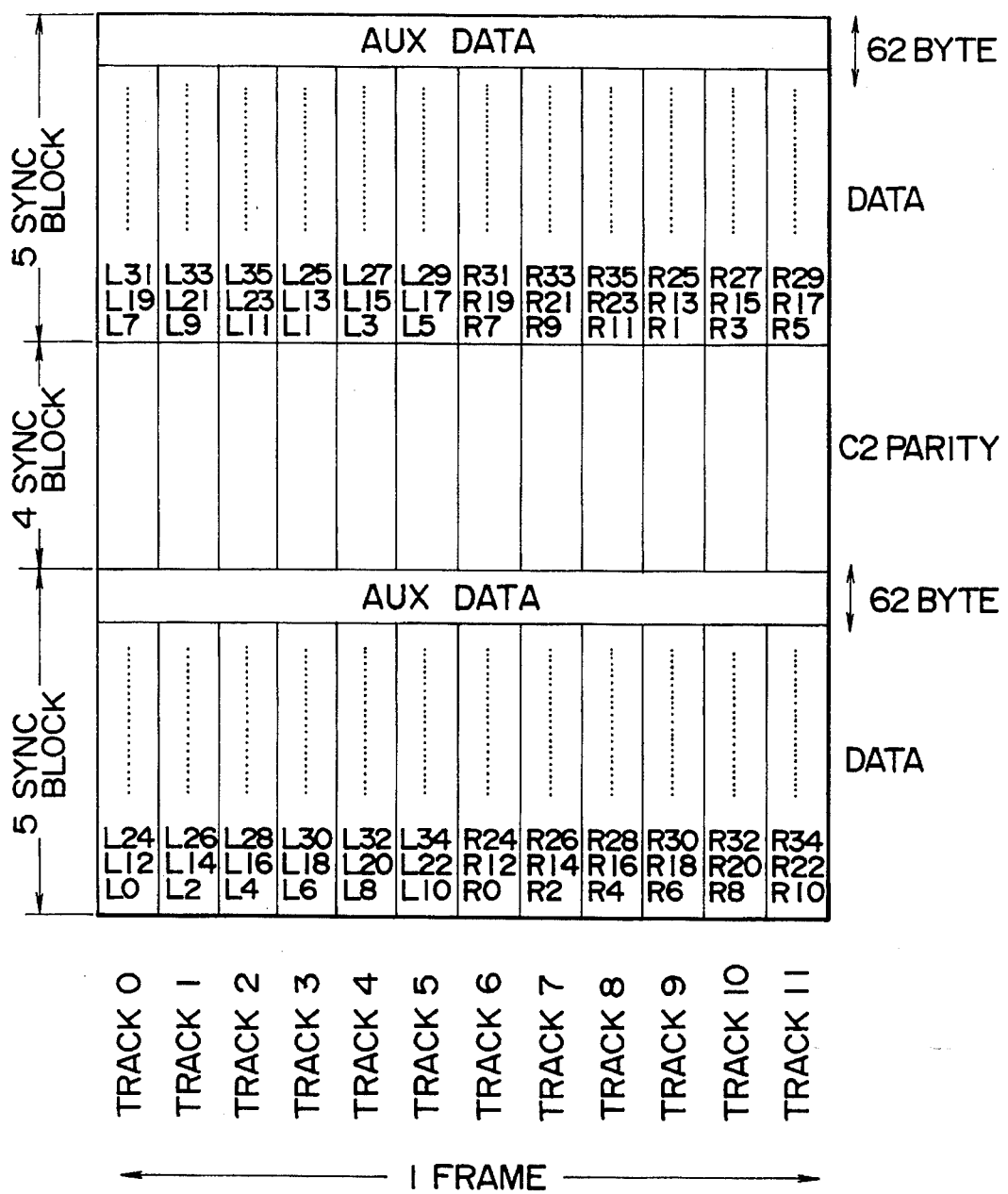
FIG. 9 is a diagram illustrating a track format for recording one frame of exclusively audio data in PAL format according to the present invention.

FIG. 9 shows the track format for recorded data according to the PAL system. This format is similar to the format shown in FIG. 4, except that the number of tracks used to represent a frame is increased from 10 to 12.

Table 2 compares characteristics for a signal in each of NTSC format and PAL format when recorded in a track format according to the present invention.

In the exclusively audio data recording region of FIG. 2A, 16 bits of audio data are recorded at a rate of 48 kHz for the left and right (two) channels at a bit rate of 1.536 Mbps. AUX data is recorded at a rate of 0.297303 Mbps (in the NTSC system) or 0.2976 Mbps (in the PAL system). The bit rate with addition of the parity, sync and ID data is 3.054545 Mbps in the NTSC system or 3.0576 Mbps in the PAL system. The values in Table 2 are based on the assumption that the field frequency in the NTSC system is 60 Hz. Actually, the NTSC field frequency is not exactly 60 Hz, so that the actual bit rates for a signal in NTSC format are 1000/1001 times the values listed in Table 2.

TABLE 2

|  | NTSC 525/60 | PAL 625/50 |
| --- | --- | --- |
| SAMPLING FREQUENCY | 48 kHz | 48 kHz |
| QUANTIZATION BITS | 16 bits | 16 bits |
| NUMBER OF CHANNELS | 2 channels | 2 channels |
| TOTAL DATA RATE | 1.536 Mbps | 1.536 Mbps |
| AUX DATA RATE | 0.297393 | 0.2976 Mbps |
| TRANSMISSION RATE | 3.054545 Mbps | 3.0576 Mbps |

In the video and audio data recording region of FIG. 2A, video data of 24.624 Mbps, audio data, parity data, sync data and ID data are recorded so that the bit rate in this region is 32.1048 Mbps.

In the subcode recording region, in addition to the subcode data of 144 kbps, parity, sync and ID data are also recorded so that the bit rate in this region is 345.6 kbps.

In addition to the above, the IBG, ambles and ATF signals are also recorded on the magnetic tape, so that the overall bit rate is 38.6136 Mbps.

Referring now to FIGS. 10 to 19, an embodiment of a digital video tape recorder for recording data on and reproducing the same from a magnetic tape in a format according to the present invention will now be described.

Figure 10:
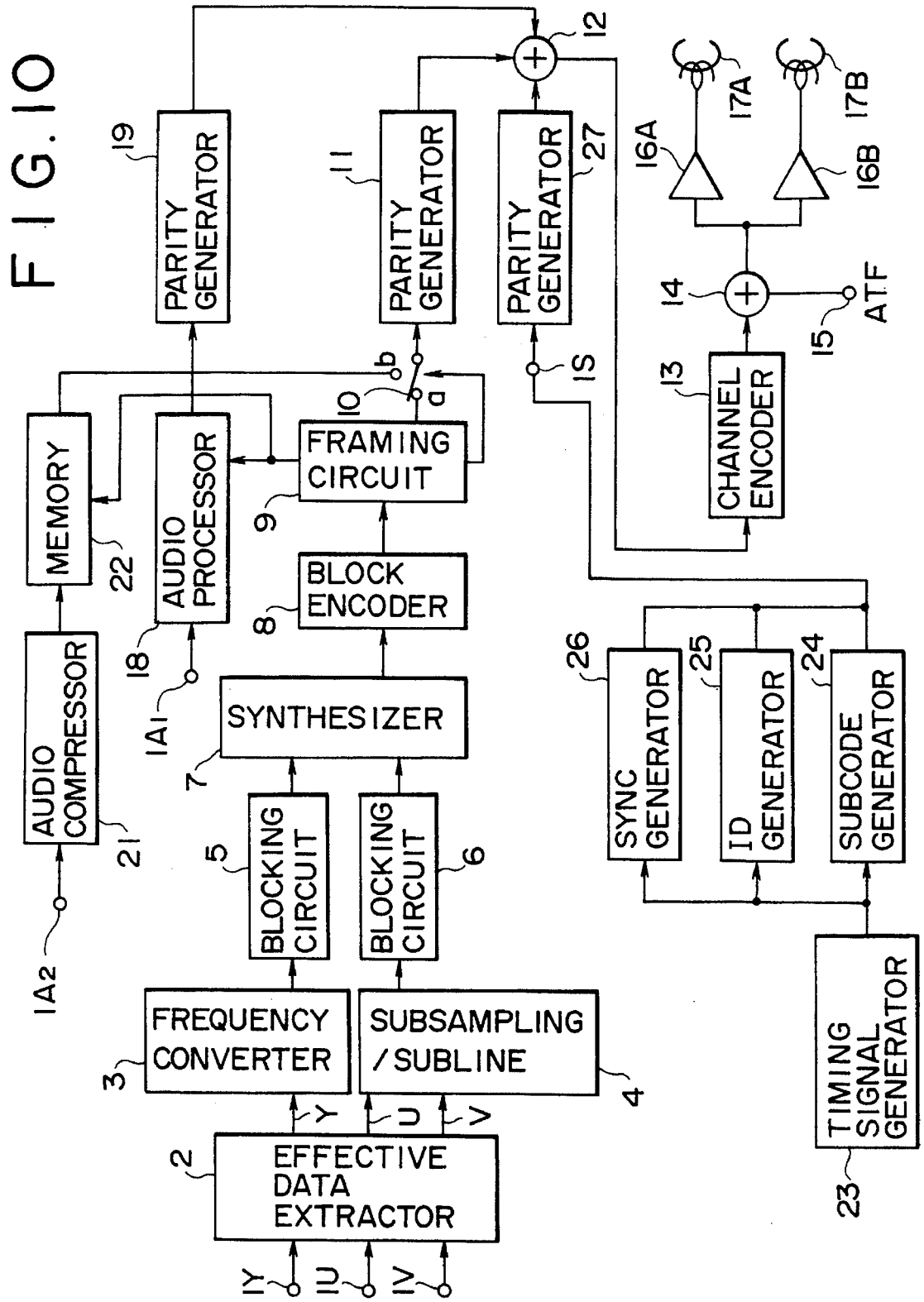
FIG. 10 is a block diagram of a recording section of a digital video tape recorder in which the present invention is applied.

FIG. 10 shows a recording section of a digital video tape recorder in which the present invention is applied. A digital luminance signal Y and digital color difference signals U, V formed from output primary color signals R, G, B of a color video camera (not shown) or the like are supplied to input terminals 1Y, 1U, 1V, respectively. The clock rate of each signal is set to 13.5 MHz, for the luminance signal, and 6.75 MHz for the color difference signals, and 8 bits are allocated to each sample thereof. The size of the luminance and color difference data is compressed by an effective data extractor 2 which functions to extract the data appropriate for recording while eliminating the data corresponding to the blanking interval.

Figure 11:
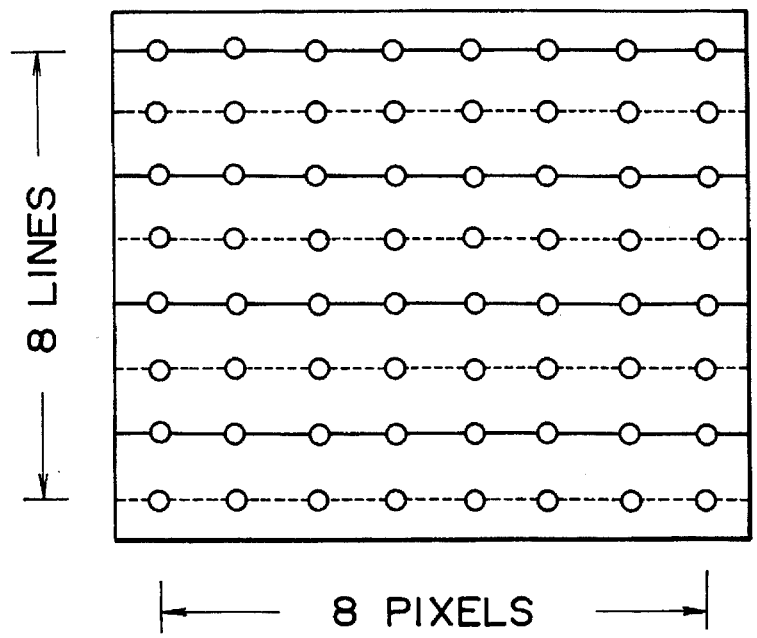
FIG. 11 is a diagram showing a block of data produced by the digital video tape recorder of FIG. 10.

The effective data extractor 2 supplies a luminance signal Y to a frequency converter 3 which is adapted to convert the sampling frequency thereof from 13.5 MHz to ¾×13.5 MHz. The frequency converter 3 may be comprised of, for example, a curtail filter so as to prevent generation of aliasing distortion and noise. The frequency converted luminance signal produced by the frequency converter 3 is supplied to a blocking circuit 5 which functions to convert the sequence of the luminance data from a raster scanning sequence to a block sequence, in which one block comprises 8×8 pixels, as illustrated in FIG. 11. In this diagram, a solid line and a broken line represent an odd-field line and an even-field line, respectively.

Figure 12:
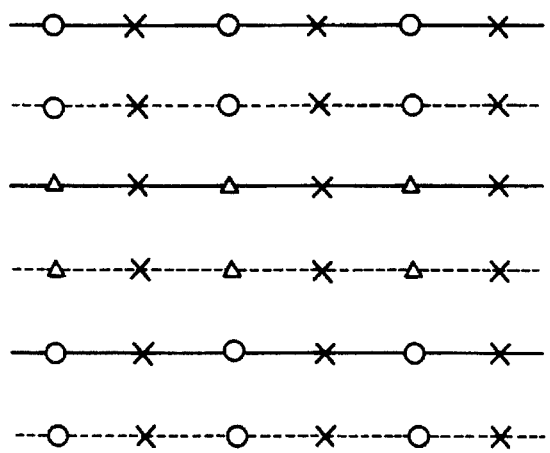
FIG. 12 is a diagram showing a synthesized color difference signal produced by the digital video tape recorder of FIG. 10.

The effective data extractor 2 also supplies two color-difference signals U and V to a subsampling/subline circuit 4 which is adapted to convert the subsampling frequency of each signal from 6.75 MHz to ½×6.75 MHz, and to alternately select the two digital color-difference signals, thereby synthesizing a line-sequential color difference signal, as shown in FIG. 12. In FIG. 12, o denotes a sampled pixel of the first color difference signal U, a denotes a sampled pixel of the second color difference signal V, and x denotes the position of a pixel curtailed by subsampling. The line-sequential color difference signal output from the subsampling/subline circuit 4 is supplied to a blocking circuit 6 which functions to convert the sequence of the line-sequential color difference signal from a raster scanning sequence to a block sequence in which one block comprises 8×8 pixels, in the same manner as the blocking circuit 5.

The blocked luminance and color difference signals produced by the blocking circuits 5 and 6 are supplied to a synthesizer 7 which is adapted to combine these signals into one channel of data, and to supply this data to a block encoder 8.

The encoder 8 is adapted to block encode the data supplied thereto, and may consist of an adaptive dynamic range coding (ADRC) or DCT circuit which may adapt to the dynamic range of each block produced by the aforementioned blocking circuits 5 and 6. The block encoder 8 supplies a block encoded signal to a framing circuit 9 which functions to convert the data to a frame structure. The framing circuit 9 preserves the clock signal of the video section to serve as the clock signal for the recording section.

Figure 13:
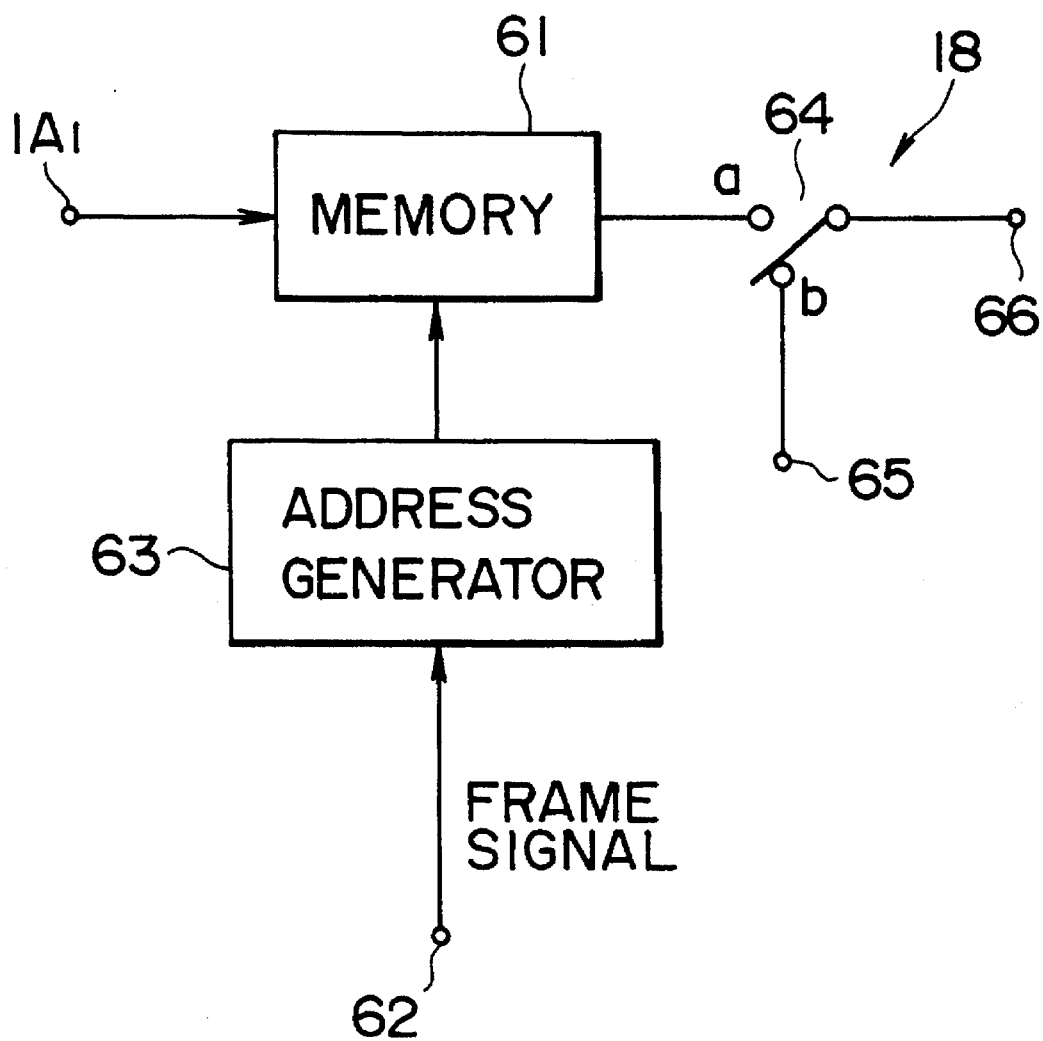
FIG. 13 is a block diagram showing an example of an audio processing circuit 18 shown in FIG. 10.

An input terminal $1A_1$ receives digital audio data which is supplied therefrom to an audio processor 18 that is adapted to execute typical audio processing for recording. The audio processor 18 may be as shown in FIG. 13 for example. More specifically, the data received at the input terminal $1A_1$ is first supplied to a memory 61 and is stored therein. An address generator 63 generates write address signals and read address signals in synchronism with a frame signal supplied thereto from the framing circuit 9 via an input terminal 62, and supplies these address signals to the memory 61. The order of the read address signals is controlled so as to be different from that of the write address signals, so that the data read out from the memory is interleaved. A switch 64 is selectively changed at a predetermined timing to be connected to the memory 61 through a contact a or to the input terminal 65 through a contact b. AUX data is supplied from a circuit, not shown, to the input terminal 65. The switch 64 thus combines the audio data and the AUX data, and supplies the combined data to an output terminal 66 as the output data of the audio processor 18.

A parity generator 19 receives the output data of the audio processor 18, and functions to generate parity data, specifically, an error-correction product code as shown in FIG. 2B. The audio data and parity data are supplied from parity generator 19 to a mixer 12, to be recorded in the exclusively audio data recording region shown in FIG. 2A.

Generally, the memory 61 in the audio processor 18 performs the function of the first interleave memory shown in FIG. 7, and the parity generator 19 shown in FIG. 10 performs the function of the C2 encoder, the second interleave memory and the C1 encoder shown in FIG. 7.

An input terminal $1A_2$ receives audio data and supplies it to an audio compressor 21. This audio data may be the same as or different from the data received at the input terminal 1A1. The audio compressor 21 is adapted to compress the audio data using, for example, differential pulse code modulation (DPCM), to produce compressed data at a rate of approximately 300 kbps. The compressed data is supplied to a memory 22 and is stored therein. The clock signal derived by framing circuit 9 controls the memory 22 to read out data stored therein at a timing which makes the readout data available as embedded audio for the video and audio data recording area shown in FIG. 2D. Simultaneously, the framing circuit 9 controls a switch 10 so as to select its contact b.

At other times, the framing circuit 9 controls the switch 10 so as to select its contact a, to which the framing circuit supplies video data in a frame structure. In this manner, the video data and the audio data are supplied from the switch 10 to a parity generator 11 which is adapted to generate parity data for the product code and to annex this parity data to the video and audio data. The composite data thus obtained is then supplied to the mixer 12.

A timing signal generator 23 supplies predetermined timing signals to each of a subcode generator 24, an ID generator 25 and a sync generator 26, which function to generate subcode data, ID data and sync data, respectively, and to supply such generated data to a terminal 1S that receives this data and supplies it to a parity generator 27. The parity generator 27 is adapted to generate parity data by executing an error-correction encoding process for the subcode data. In the subcode parity data, only an inner code included in the product code which has both inner and outer codes for error correction is used, as indicated in FIG. 2E. The subcode data, ID data, sync data and parity data thus obtained is supplied to the mixer 12.

The mixer 12 functions to mix the exclusively audio data supplied thereto from the parity generator 19, the composite audio and video data supplied thereto from the parity generator 11, and the subcode data supplied thereto from the parity generator 27 to provide data for one track in the format shown in FIG. 2A to a channel encoder 13.

The channel encoder 13, described in detail below, is adapted to perform channel coding to reduce the low-frequency components of the data for each track, and to provide recording data to a mixer 14. ATF pilot signals f1, f2, fN are supplied to an input terminal 15 and therefrom to the mixer 14. These pilot signals have low frequencies separate from the frequencies of the recording data. The mixer 14 combines the recording data and the pilot signals to produce a recording signal supplied to recording amplifiers 16A, 16B and thence to rotary transformers (not shown) and thence to magnetic heads 17A and 17B which function to record the recording signal on a magnetic tape.

Figure 14:
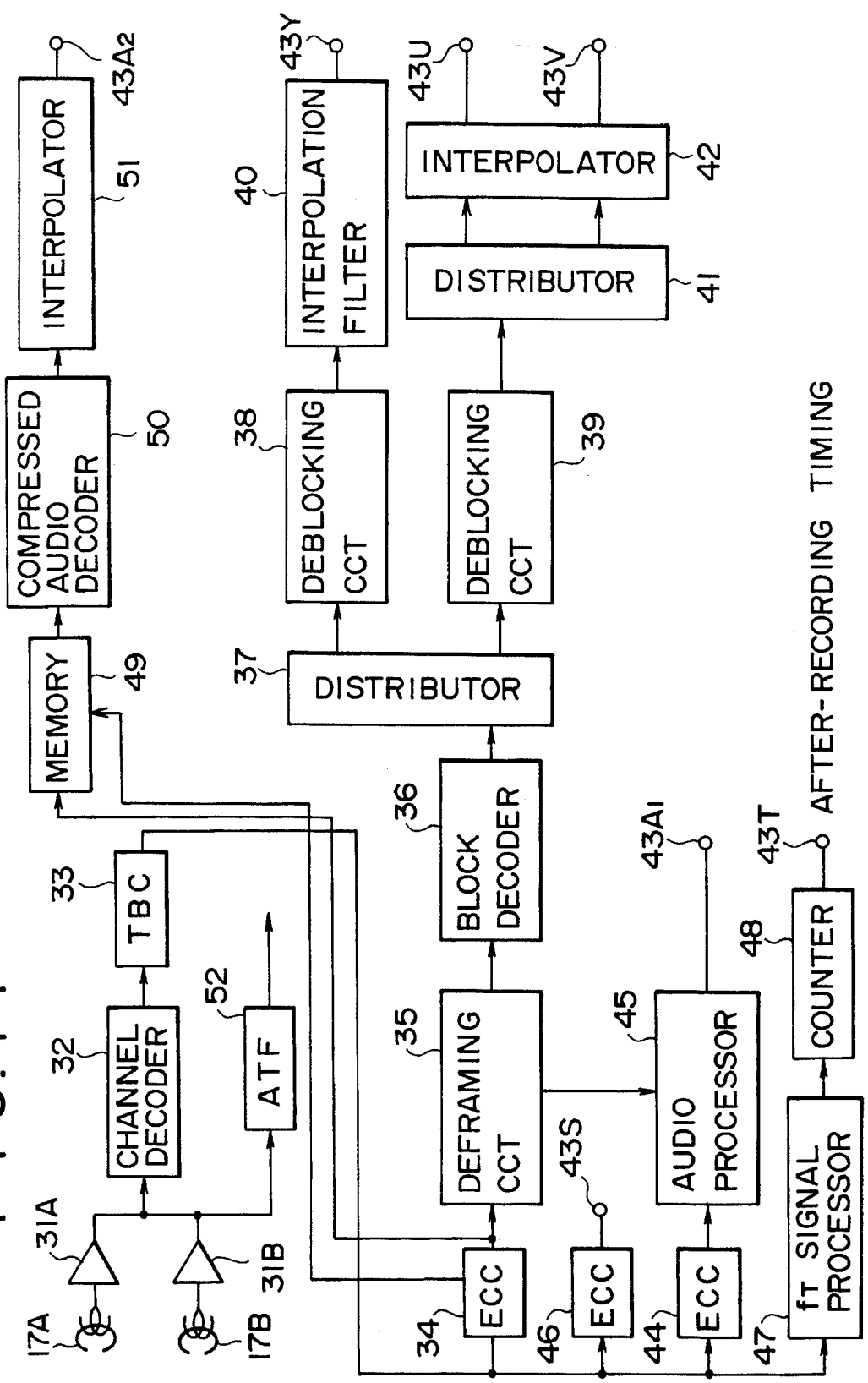
FIG. 14 is a block diagram of a reproducing section of a digital video tape recorder in which the present invention is applied.
Figure 15:
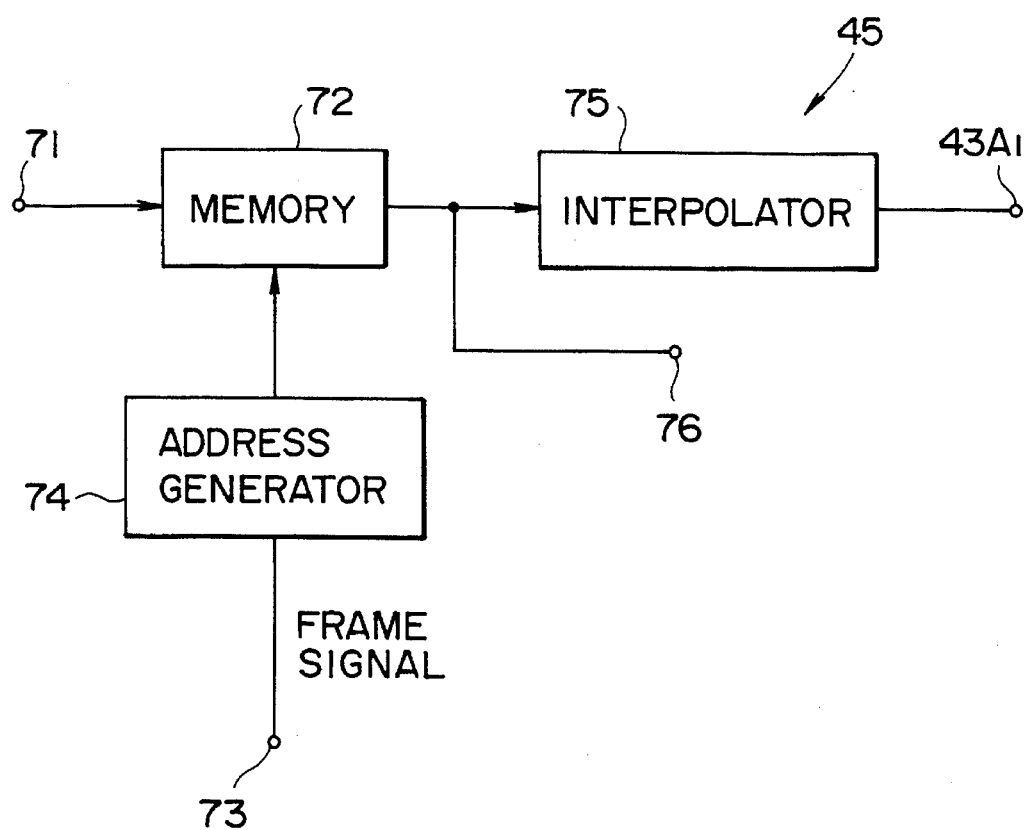
FIG. 15 is a block diagram showing an example of an audio processing circuit 45 shown in FIG. 14.

FIG. 14 shows a reproducing section of a digital video tape recorder in which the present invention is applied. In FIG. 14, magnetic heads 17A, 17B supply reproduced data via rotary transformers (not shown) and playback amplifiers 31A, 31B to each of a channel decoder 32 and an ATF circuit 52. The ATF circuit 52 is adapted to generate a tracking error signal from the level of the crosstalk component included in the reproduced pilot signal f2, as generally described above, and to supply this tracking error signal to, for example, a capstan-control phase servo circuit (not shown).

The channel decoder 32, described in detail below, is adapted to decode a channel signal from the reproduced signal and to supply the reproduced channel signal to a time base correction (TBC) circuit 33 which functions to eliminate the time base variations from the reproduced signal. The time base corrected data are supplied to error correction code (ECC) circuits 34, 44, 46 which function to correct errors by using the product codes, that is, the horizontal and vertical parity data C1, C2 recorded with the audio, video and subcode data.

The ECC circuit 34 performs both error correction and error compensation for the video and audio data recorded in the video and audio data recording area of each track. The ECC circuit 44 performs error correction for the audio data recorded in the exclusively audio data recording area of each track. The ECC circuit 46 performs error correction for the subcode data recorded in the subcode recording area of each track, and supplies an error corrected subcode to an output terminal 43S. Such subcode is then supplied to a system controller (not shown) for controlling the operation of the entire video tape recorder.

The ECC circuit 44 supplies error corrected audio data to an audio processor 45 which functions to execute processing required for reproducing the audio signal. The audio processor 45 may have the construction shown, for example, in FIG. 15, in which the error-corrected audio data from the ECC circuit 44 is supplied to an input terminal 71 and therefrom to a memory 72. A deframing circuit 35, shown in FIG. 14, supplies a frame signal to an input terminal 73, shown in FIG. 15, and therefrom to an address generator 74 that functions to generate write address signals and read address signals and apply them to the memory 72 in synchronism with the frame signal. The order of the write address signals and that of the read address signals are controlled so as to be different from each other, thereby deinterleaving the audio data so as to recover its original sequence, which it had before recording.

The deinterleaved audio data are applied to an interpolator 75 which is adapted to correct the audio data by interpolation, if necessary, and to supply the corrected audio data to an output terminal 43A1, and thence to a subsequent circuit (not shown). More specifically, the interpolator 75 interpolates the audio data reproduced from one of the upper and lower regions, shown in FIGS. 4 and 9, to correct an error in data reproduced from the other of the upper and lower regions.

The auxiliary data AUX included in the data read out from the memory 72 are supplied from an output terminal 76 to a subsequent circuit (not shown). When the auxiliary data AUX represents, for example, text of a character broadcast, this data is supplied to a CRT (not shown) or the like for display.

The ECC circuit 34 supplies error corrected video and audio data to a deframing circuit 35, which functions to separate the data supplied thereto into blocked video data and to recover the clock signal from the recording section for use as the clock signal of the video reproducing section. The blocked data are applied to a block decoder 36 that obtains, block by block, decoded data corresponding to the original video data, and supplies this decoded data to a distributor 37 which separates the decoded data into a luminance signal and a color difference signal that are applied to deblocking circuits 38 and 39, respectively, which function to convert the decoded data from a block sequence to a raster scanning sequence in a manner inverse to the blocking circuits 5 and 6 in the recording section.

The deblocking circuit 38 is coupled to an interpolation filter 40, and applies thereto a reproduced luminance signal. The filter 40 functions to change the sampling rate of the luminance signal from 3fs, where fs is the color subcarrier frequency, to 4fs=13.5 MHz, and to apply a thus obtained digital luminance signal Y to an output terminal 43Y.

The deblocking circuit 39 is coupled to a distributor 41, and applies thereto a color difference signal. The distributor 41 functions to separate the combined color difference signal into separate line-sequential digital color difference signals U and V, and to supply them to an interpolator 42. The interpolator 42 serves to interpolate the data of the curtailed pixels, indicated by the x symbol in FIG. 12, by utilizing the decoded video data. The interpolator 42 also is adapted to output the digital color difference signals U and V, each having a sampling rate of 2fs=6.75 MHz, and to apply the thus obtained signals to output terminals 43U and 43V, respectively.

The ECC circuit 34 supplies error corrected audio data recorded in the video and audio data recording area of a track to a memory 49 to be stored therein. The ECC circuit 34 also supplies an error flag to the memory 49, indicating the position of an uncorrected error, to be stored therein with the corresponding uncorrected data. The memory 49 supplies data to a compressed audio decoder 50 which functions to decode the compressed audio data and apply the uncompressed data to an interpolator 51 which serves to interpolate the data corresponding to the error flag. The interpolator 51 applies the thus obtained audio signal to an output terminal 43A$_2$, and thence to a subsequent circuit (not shown).

The time base corrected signal from the TBC circuit 33 is also supplied to an fT signal processor 47 that is adapted to detect the sync data and the ID data recorded in the ATF region of each track, as shown in FIG. 2A. The signal processor 47 determines the sync position from the sync number data in the ID data shown in Table 1, indicating the sync position, and controls a counter 48 to count at a predetermined timing. The counter 48 applies a timing signal corresponding to the playback positions of the magnetic heads 17A, 17B to an output terminal 43T, and thence to the system controller (not shown) which controls an after-recording operation in accordance with the timing signal obtained from the output terminal 43T.

Figure 16A:
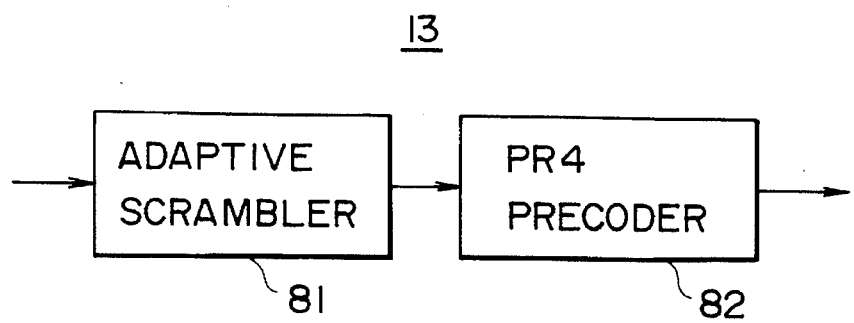
FIGS. 16A and 16B are block diagrams showing examples of a channel encoder 13 shown in FIG. 10 and a channel decoder 32 shown in FIG. 14, respectively.
Figure 16B:
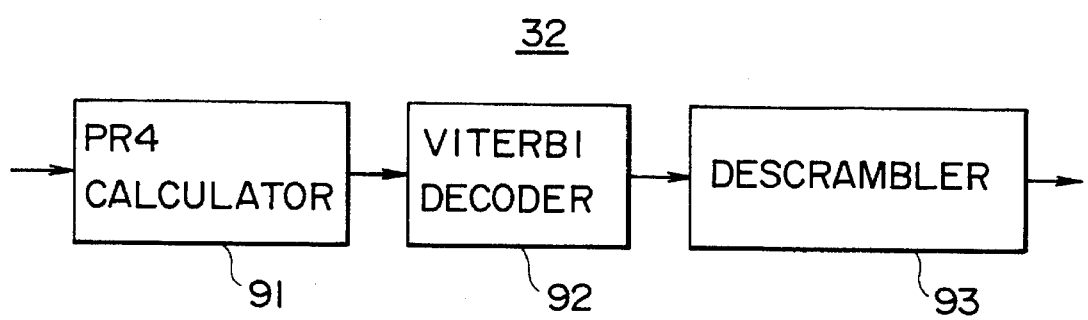

With reference to FIGS. 16A and 16B, a description will now be given of the channel encoder 13 shown in FIG. 10 and the channel decoder 32 shown in FIG. 14, respectively. Details of these circuits are disclosed in Japanese Patent Application No. Hei 1 (1989)-143491, having a common assignee with the present invention.

FIG. 16A shows a block diagram for the channel encoder 13, including an adaptive scrambler 81 and a partial response class 4 precoder 82. The scrambler 81 receives the signal mixed by mixer 12 in FIG. 10, comprising the outputs of parity generators 11, 19 and 27. The scrambler 81 may comprise scramble circuits for a plurality of lines and is adapted to select the line having an output of the highest-frequency component and the least direct-current component with respect to the input signal. The precoder 82 functions to calculate the signal $1/(1-D^2)$ with respect to the signal supplied thereto, where D denotes a unitary delay, and to supply an output, via recording amplifiers 16A, 16B, to magnetic heads 17A, 17B for recording and subsequent reproduction.

The thus reproduced signals are amplified by playback amplifiers 31A, 31B of FIG. 14. FIG. 16B shows a block diagram for the channel decoder 32, including a partial response class-4 calculator 91, a Viterbi decoder 92, and a descrambler 93. The calculator 91 functions to calculate the signal (1+ D) with respect to the signal supplied thereto, that is, the signals supplied from the playback amplifiers 31A, 31B, and to provide a signal to the decoder 92. The Viterbi decoder 92 is known to those of ordinary skill in the art and is adapted to decode data having noise added thereto based on the correlativity and the likelihood of the data, and to supply a reduced-noise output to the descrambler 93. Use of the Viterbi decoder 92 provides a reproduced signal having a carrier-to-noise (C/N) ratio which is 3 dB better than the C/N value obtained using only bit-by-bit decoding. The descrambler 93 functions to return the data to its original order, that is, it acts in an inverse manner to the scrambler 81.

Figure 17A:
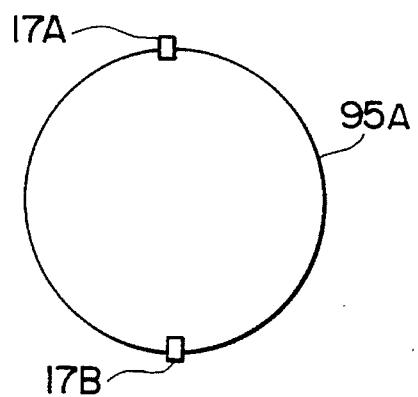
FIGS. 17A and 17B show examples of how magnetic heads 17A and 17B of FIGS. 10 and 14 may be arranged on a disk drum.
Figure 17B:
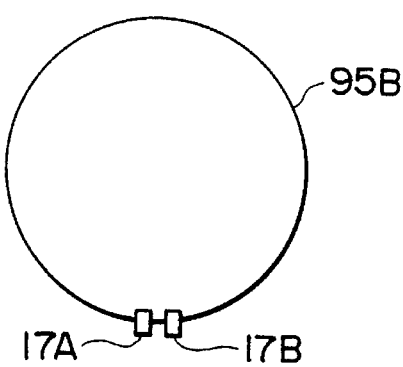

Alternative arrangements for the magnetic heads 17A, 17B of FIGS. 10 and 14 can be seen in FIGS. 17A and 17B.

FIG. 17A shows the magnetic heads 17A and 17B as attached to a rotary drum 95A and positioned opposite to each other at an angular distance of 180°. FIG. 17B shows the magnetic heads 17A and 17B disposed adjacently to form a single structure which is attached to a drum 95B. A magnetic tape is wound obliquely around the peripheral surface of the rotary drum 95A, 95B at an angle which, for example, may be slightly greater or smaller than 180 degrees, although other angular wraps are contemplated. In the head arrangement of FIG. 17A, the magnetic heads 17A and 17B are substantially alternately brought into contact with the magnetic tape. In the head arrangement of FIG. 17B, the magnetic heads 17A and 17B simultaneously scan the magnetic tape.

Figure 18A:
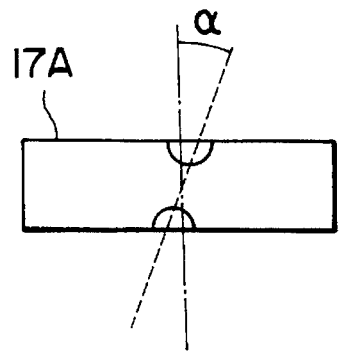
FIGS. 18A and 18B show the azimuth angles of the magnetic heads 17A and 17B, respectively, of FIGS. 10 and 14.
Figure 18B:
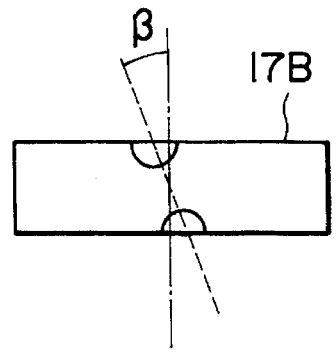
Figure 19:
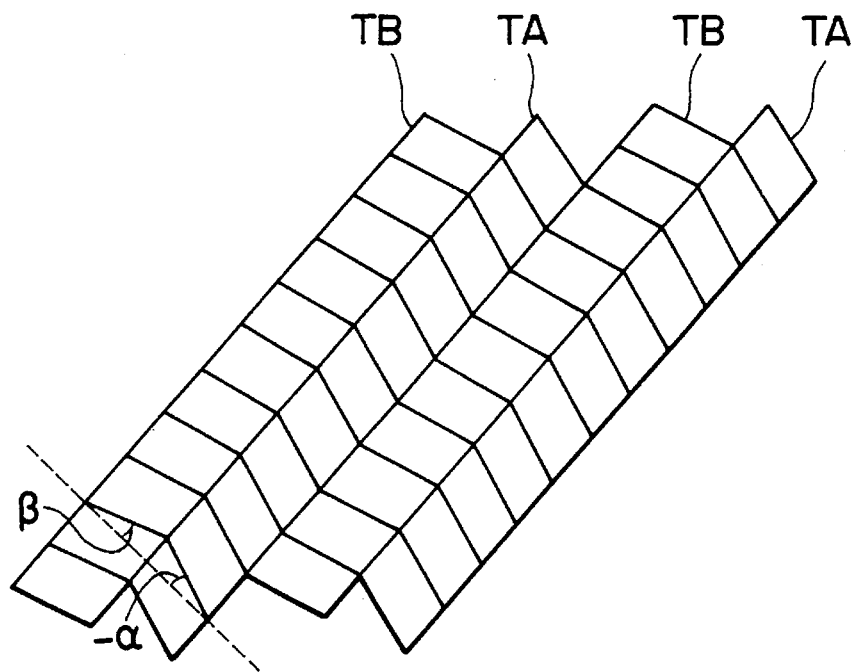
FIG. 19 illustrates tracks formed on a magnetic tape by the magnetic heads 17A and 17B in FIGS. 10 and 14.

The respective azimuth angles (gap directions) of the magnetic heads 17A and 17B are different. For example, as shown in FIGS. 18A and 18B, the magnetic heads 17A and 17B exhibit azimuth angles of ±20° (−α, β). Due to the difference between the respective azimuth angles, a recording pattern shown in FIG. 19 is formed on the magnetic tape. As can be seen from FIG. 19, adjacent tracks TA and TB on the magnetic tape are formed respectively by the magnetic heads 17A and 17B having mutually different azimuth angles. Signal deterioration or interference due to crosstalk from adjacent tracks may be reduced as a result of azimuth loss when the tracks are formed with heads having mutually different azimuth angles.

In the embodiment described above, the numbers of bytes representing the lengths of the individual recording regions in FIG. 2A are simply examples, and it is possible to slightly change such lengths. Then, in the above embodiment where the ratio of the exclusively audio data recording region to the video and audio data recording region is 1:10.5 (=1274/13377), it follows that the ratio is also somewhat changed. In view of efficiency and other considerations, it is preferred that this ratio be about 1:10.

Although the present invention has been described with reference to an embodiment of a digital video tape recorder, the invention is applicable also to other situations in which digital data is recorded on a disk or other recording medium.

In the present invention, odd data and even data are recorded in mutually different regions so that a dropout of the data in one region can be compensated using the data in the other region to thereby produce satisfactory data resembling the original data. Thus, noise is reduced in a reproduced signal according to the present invention.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method of recording digital data in a plurality of tracks on a recording medium, comprising the steps of:

respectively separating said digital data representing two channels and associated with a frame of video data into odd-numbered data segments and even-numbered data segments;

recording the odd-numbered data segments associated with a first channel of said frame in a first region on a first set of consecutive tracks;

recording the even-numbered data segments associated with said first channel of said frame in a second region on said first set of consecutive tracks, said second region being distinct from said first region;

recording the odd-numbered data segments associated with a second channel of said frame on a first region of a second set of consecutive tracks following said first set;

recording the even-numbered data segments associated with said second channel of said frame on a second region of said second set of consecutive tracks;

compressing said digital data representing two channels in order to produce compressed digital data;

compressing said video data in order to produce compressed video data; and recording said compressed digital data representing two channels and said compressed video data in a third region of said first set of consecutive tracks and in a third region of said second set of consecutive tracks.

2. The recording method of claim 1, further comprising the step of recording at least one of parity data and auxiliary data in a fourth region on each track, said fourth region being located between said first and second regions.

3. The recording method of claim 2, further comprising the step of generating the parity data as a function of the digital data.

4. The recording method of claim 1, further comprising the step of interleaving one of the odd-numbered data segments and the even-numbered data segments before the data segments are recorded.

5. An apparatus for recording audio data for two channels and a frame of video data on tracks of a recording medium, comprising:

means for separating the audio data for each of the two channels associated with said frame of video data into odd-numbered data segments and even-numbered data segments;

means for generating parity data for a predetermined amount of the audio data for each of the two channels;

means for recording the odd-numbered data segments for one channel associated with said frame in a first region of each track in a first set of consecutive tracks, the even-numbered data segments for said one channel associated with said frame in a second region of each of the tracks in said first set, the odd-numbered data segments for the other channel associated with said frame in the first region of each track in a second set of consecutive tracks, the even-numbered data segments for said other channel associated with said frame in the second region of each of the tracks in said second set, and at least one of parity data or auxiliary data in respective third regions of each of the tracks in said first and second sets, the third region being between the first and second regions;

means for compressing said audio data in order to produce compressed audio data;

means for compressing said video data in order to produce compressed video data; and means for recording said compressed audio data and said compressed video data in a fourth region of each of the tracks in said first set and in said second set.

6. The recording apparatus of claim 5, further comprising means for generating the parity data as a function of the audio data.

7. An apparatus for recording video data and two-channel audio data in tracks on a recording medium, comprising:

means for compressing the two-channel audio data;

means for compressing a frame of the video data;

means for recording the compressed video data and the compressed two-channel audio data in video and audio areas, respectively, of each of the tracks in a set of the tracks;

means for separating the audio data associated with said frame of the video data into odd-numbered data segments and even-numbered data segments for each of the two channels;

means for generating parity data for a predetermined amount of the audio data for each channel; and means for recording the odd-numbered data segments for one channel associated with said frame in a first region of an audio area of each of the tracks in a first portion of consecutive tracks in said set of the tracks, the even-numbered data segments for said one channel associated with said frame in a second region of the audio area of each of the tracks in said first portion, the odd-numbered data segments for the other channel associated with said frame in the first region of the audio area of each of the tracks in a second portion of consecutive tracks in said set of the tracks, the even-numbered data segments for said other channel associated with said frame in the second region of the audio area in each of the tracks in said second portion, and at least one of parity data or auxiliary data in a third region of each of the tracks in said first and second portions, the third region being between said first and second regions.

8. A method of recording digital data in a plurality of tracks on a recording medium, comprising the steps of:

respectively separating said digital data representing two channels and associated with a frame of video data into odd-numbered data segments and even-numbered data segments;

interleaving one of the odd-numbered data segments and the even-numbered data segments before the data segments are recorded including rearranging the data in the one of the odd-numbered data segments and the even-numbered data segments, positioning placeholder data after a contiguous portion of the rearranged odd-numbered or even-numbered data segments, and substituting parity data for the placeholder data;

recording the odd-numbered data segments associated with a first channel of said frame in a first region on a first set of consecutive tracks;

recording the even-numbered data segments associated with said first channel of said frame in a second region on said first set of consecutive tracks, said second region being distinct from said first region recording the odd-numbered data segments associated with a second channel of said frame on a first region of a second set of consecutive tracks following said first set; and recording the even-numbered data segments associated with said second channel of said frame on a second region of said second set of consecutive tracks.

9. An apparatus for recording audio data for two channels on tracks of a recording medium, comprising:

means for separating the audio data for each of the two channels associated with a frame of video data into odd-numbered data segments and even-numbered data segments;

means for generating parity data for a predetermined amount of the audio data for each of the two channels;

means for rearranging the odd-numbered and even-numbered data segments for each of the two channels;

means for positioning placeholder data after a contiguous portion of the rearranged odd-numbered or even-numbered data segments;

means for substituting the parity data for the placeholder data; and means for recording the odd-numbered data segments for one channel associated with said frame in a first region of each track in a first set of consecutive tracks, the even-numbered data segments for said one channel associated with said frame in a second region of each of the tracks in said first set, the odd-numbered data segments for the other channel associated with said frame in the first region of each track in a second set of consecutive tracks, the even-numbered data segments for said other channel associated with said frame in the second region of each of the tracks in said second set, and at least one of parity data or auxiliary data in respective third regions of each of the tracks in said first and second sets, the third region being between the first and second regions.

* * * * *